United States Patent [19]

Hale et al.

[11] Patent Number: 5,260,269
[45] Date of Patent: * Nov. 9, 1993

[54] METHOD OF DRILLING WITH SHALE STABILIZING MUD SYSTEM COMPRISING POLYCYCLICPOLYETHERPOLYOL

[75] Inventors: Arthur H. Hale; George C. Blytas, both of Houston, Tex.

[73] Assignee: Shell Oil Company, Houston, Tex.

[*] Notice: The portion of the term of this patent subsequent to Dec. 17, 2008 has been disclaimed.

[21] Appl. No.: 671,626

[22] Filed: Mar. 19, 1991

Related U.S. Application Data

[63] Continuation-in-part of Ser. No. 420,868, Oct. 12, 1989, abandoned.

[51] Int. Cl.⁵ .................................................. C09K 7/02
[52] U.S. Cl. ....................................... 507/136; 507/139
[58] Field of Search ................. 252/8.51, 8.511, 8.513, 252/8.514; 507/136, 139; 175/65

[56] References Cited

U.S. PATENT DOCUMENTS

| | | | |
|---|---|---|---|
| 2,191,312 | 2/1940 | Cannon | 255/1 |
| 2,416,035 | 2/1947 | Whittier | 166/292 X |
| 2,423,144 | 7/1947 | Gregg | 252/49.5 |
| 2,697,692 | 12/1954 | Salathiel | 252/8.5 |
| 2,797,196 | 6/1957 | Dunn et al. | 252/8.5 |
| 2,822,873 | 2/1958 | Harmsen et al. | 166/292 |
| 2,826,548 | 3/1958 | Busch | 252/8.5 |
| 2,890,753 | 6/1959 | White | 166/42 |
| 2,931,772 | 4/1960 | Brukner | 252/8.55 |
| 2,973,320 | 2/1961 | Brukner | 252/8.5 |
| 3,168,139 | 2/1965 | Kennedy et al. | 166/292 |
| 3,525,688 | 8/1970 | Swanson | 252/8.51 |
| 3,557,876 | 1/1971 | Tragesser | 166/292 |
| 3,637,774 | 1/1972 | Babayan et al. | 260/410.6 |
| 3,639,233 | 2/1972 | Schultz et al. | 252/8.5 M |
| 3,668,122 | 6/1972 | Branscum | 252/8.5 A |
| 3,728,259 | 4/1973 | Christman | 252/8.5 C |
| 3,738,437 | 6/1973 | Scheuerman | 175/70 |
| 3,887,009 | 6/1975 | Miller et al. | 166/292 |
| 3,921,717 | 11/1975 | Danjushevsky et al. | 166/292 |
| 4,063,603 | 12/1977 | Rayborn | 175/65 |
| 4,299,516 | 11/1981 | Miyoshi et al. | 166/292 X |
| 4,306,981 | 12/1981 | Blair, Jr. | 252/8.55 D |
| 4,400,295 | 8/1983 | Ootsu et al. | 252/356 |
| 4,456,067 | 6/1984 | Pinner, Jr. | 166/279 |
| 4,464,274 | 8/1984 | House | 252/8.5 P X |
| 4,478,612 | 10/1984 | Diaz et al. | 55/29 |
| 4,508,628 | 4/1985 | Walker et al. | 252/8.5 P |
| 4,519,452 | 5/1985 | Tsao et al. | 166/293 X |
| 4,526,693 | 7/1985 | Son et al. | 252/8.5 B |
| 4,548,660 | 10/1985 | Ikeda et al. | 149/21 |
| 4,597,779 | 7/1986 | Diaz | 55/32 |

(List continued on next page.)

FOREIGN PATENT DOCUMENTS

| | | |
|---|---|---|
| 324887A | 1/1988 | European Pat. Off. . |
| 374671A | 12/1988 | European Pat. Off. . |
| 382070A | 2/1989 | European Pat. Off. . |
| 382071A | 2/1989 | European Pat. Off. . |
| 386636A | 3/1989 | European Pat. Off. . |
| 386638A | 3/1989 | European Pat. Off. . |
| 391251A | 4/1989 | European Pat. Off. . |
| 391252A | 4/1989 | European Pat. Off. . |
| 398112A | 5/1989 | European Pat. Off. . |
| 398113A | 5/1989 | European Pat. Off. . |
| 399270A1 | 5/1989 | European Pat. Off. . |
| 374672A | 12/1989 | European Pat. Off. . |
| 255605 | 7/1986 | Fed. Rep. of Germany . |
| 2089397 | 6/1982 | United Kingdom 252/151 |
| 2216573A | 10/1989 | United Kingdom . |
| 2216574A | 10/1989 | United Kingdom . |
| 2223255A | 4/1990 | United Kingdom . |

OTHER PUBLICATIONS

"Formation of Hydrates During Deepwater Drilling Operations," by J. W. Barker and R. K. Gomez, *Journal of Petroleum Technology*, Mar. 1989, pp. 297–301.

Antipin, Yu V. "Control of Gympsum Deposits in Wells," Neft. Khoz. No. 11, Nov. 1987, pp. 52–55.

Belousov, G. A. et al "Spacer Fluid for Separating Drilling Mud and Cement Slurry", Neft Khoz. No. 8, Aug. 1987, pp. 25–29.

*Primary Examiner*—Gary Geist

[57] ABSTRACT

An aqueous base drilling fluid additive composed of salt and lime or gypsum, and including an acyclic polyol and/or cyclicetherpolyol and salt.

5 Claims, 10 Drawing Sheets

U.S. PATENT DOCUMENTS

| | | | |
|---|---|---|---|
| 4,615,813 | 10/1986 | Bretz | 252/8.514 |
| 4,664,818 | 5/1987 | Halliday et al. | 252/8.511 |
| 4,690,774 | 9/1987 | Vishnupad et al. | 252/309 |
| 4,719,021 | 1/1988 | Branch, III | 252/8.514 |
| 4,767,549 | 8/1988 | McEwen et al. | 252/8.514 |
| 4,780,220 | 10/1988 | Peterson | 252/8.514 |
| 4,802,998 | 2/1989 | Mueller et al. | 252/8.514 |
| 4,839,096 | 6/1989 | Dennis et al. | 252/8.511 X |
| 4,883,125 | 11/1989 | Wilson et al. | 166/293 X |
| 5,072,794 | 12/1991 | Hale et al. | 175/65 X |
| 5,076,373 | 12/1991 | Hale et al. | 175/65 X |
| 5,083,622 | 1/1992 | Hale et al. | 175/65 X |
| 5,085,282 | 2/1992 | Hale et al. | 175/65 X |

METHOD OF DRILLING WITH SHALE STABILIZING MUD SYSTEM COMPRISING POLYCYCLICPOLYETHERPOLYOL

This is a continuation-in-part of application Ser. No. 07/420,868, filed Oct. 12, 1989 now abandoned.

BACKGROUND OF THE INVENTION

1. Field of the Invention

This invention pertains to drilling fluids used in the drilling of oil and gas wells. In particular, the invention provides drilling fluid additives that provide significantly improved inhibition of cuttings dispersion and borehole stability.

2. Description of the Prior Art

In the drilling of an oil or gas well, a drilling fluid is circulated to the bottom of a borehole and ejected into the borehole from a drill bit. Usually, the drilling fluid returns to the surface of the well through the annulus of the borehole. Alternatively, the drilling fluid rises to the surface from the bottom of the borehole through a drill stem. Various additives may be added to the drilling fluid at the surface to enhance its performance.

In order to perform the boring operation most effectively, the drilling fluid should possess a number of properties. Thus, the drilling fluid should be capable of suspending the solid particles from the drilling operation when the drilling fluid ceases to circulate in the borehole, transporting the cuttings resulting from the drilling operation out of the borehole, avoiding excessive amounts of fluid loss during drilling operations, cooling and lubricating the drill bit, providing a wall cake upon the borehole wall, and providing hydrostatic pressure to the borehole to prevent the borehole from caving in or blowing out while using drilling fluids in a high pressure environment.

Water base drilling fluids typically include water and several additives or dispersants such as viscosifiers, thinners, dissolved salts, and solids. The term "water base" is used to distinguish these drilling fluids from oil base drilling fluids and oil-in-water emulsion drilling fluids and means that no oil is intentionally added to the drilling fluid. In drilling short distances, water alone has been used as the drilling fluid, but it lacks the lifting power, lubricity and borehole supporting properties provided by conventional deep well additives. More frequently, solids-containing water base fluids with greater density, lifting power and borehole supporting properties than water alone are employed as drilling fluids.

Many different additives and dispersants have been utilized that provide desired properties in drilling fluids. Exemplary are barium sulfate (barite), bentonite, low and medium yield clays, salt water clay, iron oxide, calcium carbonate, starch, carboxymethylcellulose, acrylonitrile, natural gum, molecularly dehydrated phosphate, tannin compound, quebracho, mined lignins, lignosulfonate, mica, sugar cane fibers, and granular materials. Bentonite is an especially common additive which gives the drilling fluid a thixotropic or gel structure; lignite is also a common additive which is added to the drilling fluid to control fluid loss; phosphate and lignosulfonate additives which deflocculate colloidal salts and thin the drilling fluid are also common.

Soft subterranean formations present the greatest problems for water base drilling fluids, especially formations of colloidal clays such as shales and gumbos, which tend to hydrate and swell when exposed to water base drilling fluids. Such swelling results in the formation of gummy, sludge-like paste in the borehole and reduces the cutting efficiency of the drill bit, thickens and impedes the circulation of drilling fluid, and plugs the drill. This is particularly true in drilling shales and related rock types where not only does the volume of the cuttings increase when hydrated, but the absorption water from the drilling fluid and dispersion of the shale increase both the viscosity of the circulated fluid and the torque demand on the drilling unit. Sometimes, enough torque can be exerted to cause the string to break or separate. Sometimes the viscosity increase results in fracturing the wellbore and lost circulation. Also, the shale and gumbo cuttings can stick to the surface of the drill bit and reduce its cutting efficiency by forming a layer between the bit and the formation being drilled. Further, the walls of the hole may collapse or become coated with hydrated cuttings, which makes it difficult to analyze the geologic structure penetrated, and the sludge of hydrated cuttings may stop the progress of a logging device or impede the operation thereof. Also, the collapse of the borehole wall may result in stuck pipe, poor circulation, poor cement and completion, and can result in excessive cost.

In spite of all of the above problems which are frequently encountered when softer formations are drilled with water base drilling fluids, such fluids are becoming increasingly attractive as compared to oil base drilling fluids. Generally, oil base drilling fluids are superior to water base drilling fluids by most measurements except one, environmental. Oil base drilling fluids are particularly difficult to dispose offshore, since such fluids cannot be dumped into the ocean, and it is in the offshore area that water base drilling fluids are drawing the most interest.

Calcium base drilling fluids, e.g., lime and gypsum, have been in use for quite some time, and are considered to work better than many other water base drilling fluids to reduce cuttings dispersion and increase wellbore stability, although still not nearly measuring up to the effectiveness of oil base drilling fluids. The mechanism of stabilization by the calcium cation is somewhat controversial, although there is some opinion that the calcium cation can exchange with the counterbalancing cations on clays in a formation and thus reduce the amount of hydration that can occur. Other features of the calcium base drilling fluids are also attractive, i.e., high tolerance to drill solids, reduced water dilution, decreased consumption of barite in weighted muds, and ability to control pH in spite of high $CO_2$ influxes. Accordingly, it is readily apparent that the calcium base drilling fluids would be exceedingly attractive if they could approach the effectiveness of oil base drilling fluids in reducing cuttings dispersion and increasing wellbore stability.

Accordingly, the present invention is directed to overcoming the above noted problems in the art and in particular, problems of borehole stability and cuttings dispersion inhibition experienced in the use of calcium base muds.

SUMMARY OF THE INVENTION

It is a purpose of the present invention to provide drilling fluid compositions and processes for the use thereof which effectively inhibit cuttings dispersion and improve borehole stability.

The purpose of the invention is achieved through use of a fluid in oil and gas wells comprising water and a calcium compound, and including a salt and/or an alcohol. The invention also comprises a drilling fluid which is a mixture of solids and liquids, the solids comprising a gelling agent selected from the group consisting of drilled solids, bentonite, subbentonite clays, and mixtures thereof; the liquids comprising a solution of water and a calcium compound, and including a salt and/or an alcohol. The invention further comprises a method for drilling a well comprising: drilling a wellbore and circulating a fluid in the wellbore, said fluid comprising water and a calcium compound, and including a salt and/or an alcohol. More preferably, the calcium compound is lime, gypsum or mixtures thereof, and the alcohol is an acyclic polyol, a mixture of acyclic polyols, a cyclicetherpolyol, a mixture of cyclicetherpolyols, or mixtures thereof. Among cyclicetherpolyols, polycyclicpolyetherpolyols are preferred. "Poly" is used to mean two or more.

Other purposes, distinctions over the art, advantages and features of the invention will be apparent to one skilled in the art upon review of the following.

Figure 1:
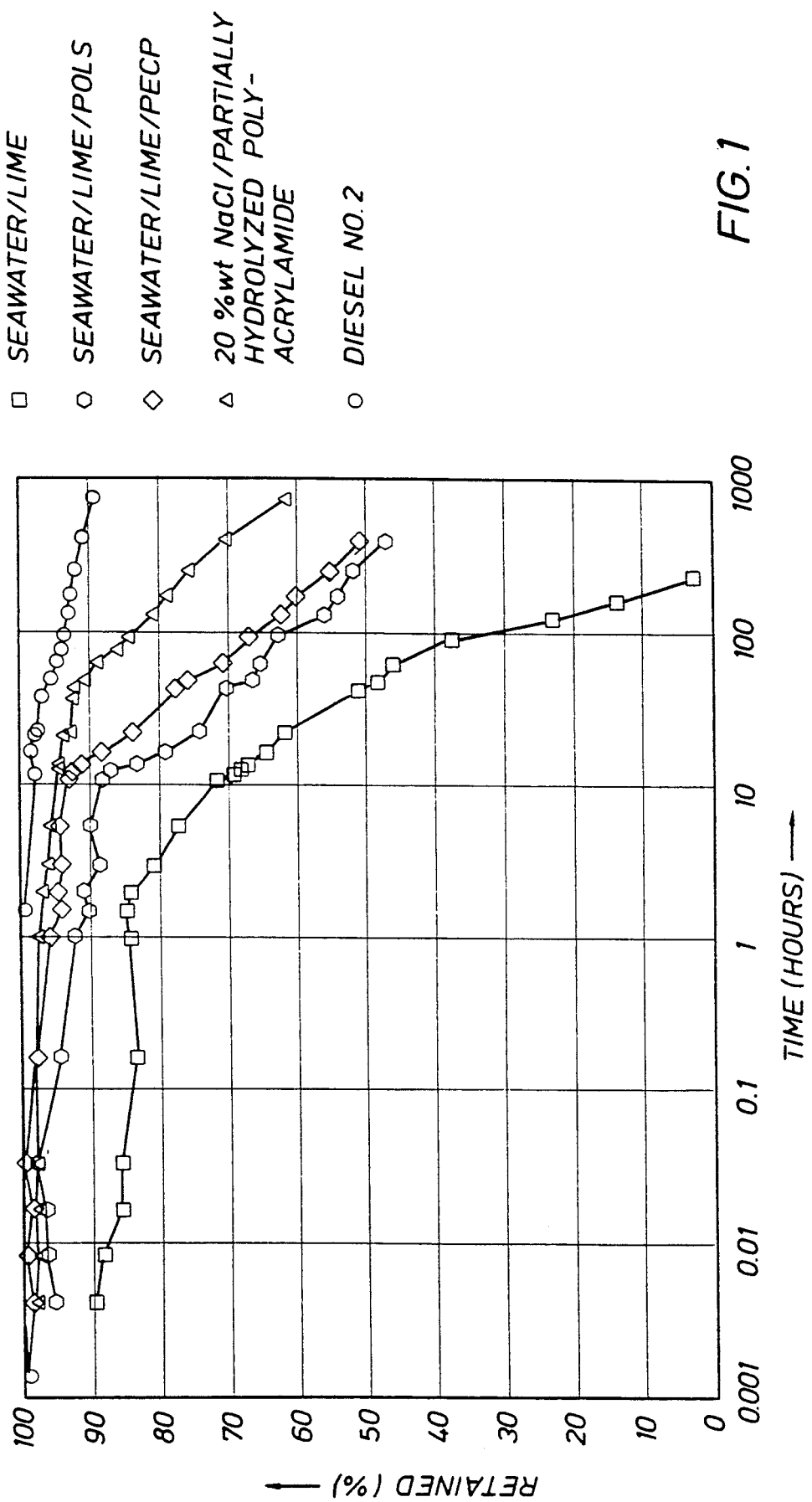
FIGS. 1-10 are graphs which plot percent retained versus time and shows the results of hot rolling tests run with shale hot rolled with test solutions at elevated temperatures for selected periods of time.

All hot rolling tests were run with shale equilibrated to 50% humidity and sized between 6 and 10 mesh; 2.5 grams of shale was hot rolled with 100 milliliters of test solution at 150° F. for the indicated time period. At the end of this time, the shale/test solution slurry was sized on 10, 30, and 80 mesh screens. The samples were washed twice with approximately 100 milliliters of fresh water and/or isopropanol. The retained shale was then dried at 105° C. for 12 hours and weighed. The total retained represents that retained on all three screens. The amount retained divided by 2.5 grams times 100 is the percent retained. The "predicted value" is what would result if the percent retained of individual components minus the percent retained of fresh water were added together and the percent retained for fresh water added to the sum. The "experimental value" is what was actually observed when all additives for a given solution were tested together. "PHPA" is partially hydrolyzed polyacrylamide. "PECP" is a mixture of polyols including polyetherpolycyclicpolyols and more particularly described hereinafter. "POLS" is a mixture of polyols including propylene glycol and derivatives thereof and more particularly described hereinafter. For the components shown on the graph but for which a concentration is not listed, "Fresh water" and "Sea water" are 1 bbl each; "Gypsum" and "Lime" are 4 lbs/bbl of solution; "POLS" is 18.7% w based on the total solution; "PECP" is 10% w or 5% w based on the total gypsum or lime based solution, respectively; "PHPA" is 0.25 lb/bbl of solution; "Diesel No. 2" is 100% of the solution.

Description of Preferred Embodiments

The following preferred embodiments of the invention, together with the following examples, explain the principles of the invention.

As practiced with the invention, a water base fluid is admixed with salt and a calcium compound in an amount effective to stabilize colloidal clays. Colloidal clays include shales, gumbos and like formations. Preferably an alcohol or mixture of alcohols also is admixed with the water base fluid. By "water base" is meant fresh water, brackish water, seawater, brine, simulated brine, or mixtures thereof.

The water base drilling fluids of the present invention frequently will contain an effective amount of at least one ingredient selected from the following: barium sulfate (barite), bentonite, low and medium yield clays, salt water clay, iron oxide, calcium carbonate, starch, carboxymethyl cellulose, acrylonitrile, natural gum, molecularly dehydrated phosphate, tannin compound, quebracho, mined lignins, lignosulfonate, mica, sugar cane fibers, granular material, sodium hydroxide, potassium hydroxide, sodium carbonate, ferrite, fluorite, hematite, and like compounds known to the art.

A preferred class of alcohol component(s) of the additive of this invention are acyclic polyols having at least 2 carbon atoms and 2 hydroxyl groups but no more than 18 carbon atoms and 13 hydroxyl groups. Preferably, the polyols of the invention have at least 2 carbon atoms and 2 hydroxyl groups but no more than 9 carbon atoms and 7 hydroxyl groups.

Nonlimiting examples of such polyols include (carbon chains may be straight or branched), ethylene glycol, diethylene glycol, 1,2-propanediol, 1,3-propanediol (propylene glycol), neopentyl glycol, pentaerythritol, 1,6-hexanediol, glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, polyethylene glycols, polypropylene glycols, ethylenepropylene glycol, polyethylenepropylene glycols, ethylenepropylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentane-dimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanedimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1 hydroxy cyclobutanemethanol, 3-methyl-2,2-butanediol, 1,2-pentanediol, 1,3-pentanediol, 1,4-pentanediol, 2,3-pentanediol, 2,4-pentanediol, 1,2,3-pentanetriol, 1,2,4-pentanetriol, 2,3,4-pentanetriol, 1,1-cyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol, sorbitol, mannitol.

More preferred alcohols are cyclicetherpolyols having at least 6 carbon atoms, at least 2 hydroxyl groups, and at least 2 ether linkages. Even more preferred are cyclicetherpolyols having at least 15 carbon atoms, 5 ether linkages, and at least 2 hydroxyl groups, or at least 15 carbon atoms, at least 7 ether linkages and at least 3 hydroxyl groups. Most preferred are cyclicetherpolyols having at least 18 carbon atoms, at least 6 hydroxyl groups, and at least 6 ether linkages. Molecular structures with significantly larger molecular weights than the above minimums have been found to be advantageous. Among the cyclicetherpolyols, monocyclicdietherdiols are preferred and polycyclicpolyetherpolyols are most preferred. "Poly" is used to mean two or more.

Cyclicetherpolyols can be obtained, for example, by extraction from saline water byproduct streams arising from the manufacture of epoxy resins, e.g., by reaction of epichlorohydrin and bisphenol A as described in U.S. Pat. No. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic diethers, the number of moles of water expelled must be at least equal to the number of glycerol (or other polyhydric, at least trihydric, polyol) used in the reaction mixture.

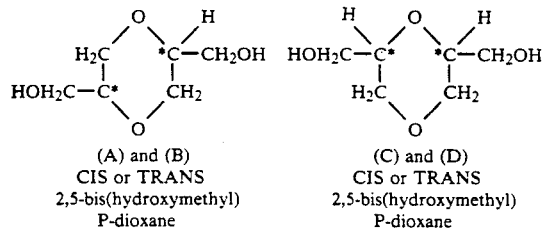

(A) and (B)
CIS or TRANS
2,5-bis(hydroxymethyl)
P-dioxane (C) and (D)
CIS or TRANS
2,5-bis(hydroxymethyl)
P-dioxane

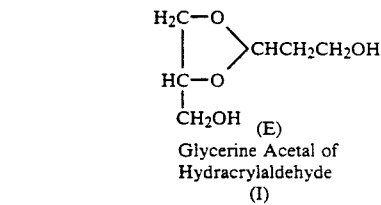

(E)
Glycerine Acetal of
Hydracrylaldehyde
(I)

In structures A through D, CIS and TRANS refer to the stereoisomerism of the carbon atoms marked by an asterisk. Structures A through D can also be called bis-hydroxymethyl 1,4-P-dioxanes.

Polycyclicpolyetherpolyols may in turn be prepared by polycondensation of compounds such as (A) through (E) supra in chemical processes which are accompanied by significant expulsion of water molecules from the polymerizing compounds. The number of ether linkages equals the number of water moles expelled. Taking (C) or (D) supra as the building unit, the lowest molecular weight structure containing two such units is Structure (II) infra, containing two terminal hydroxyl groups, and five ether linkages. Structure (II) is formed by condensation from glycerol molecules with the expulsion of five water molecules.

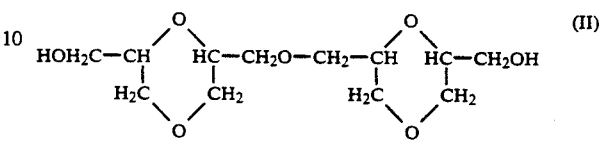

This structure is a di-cyclicpoly (or penta) etherdiol, and can be called di-bis-hydroxymethyl 1,4-P-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

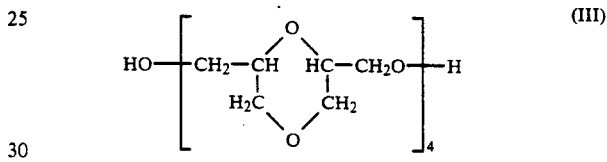

Copolycondensation of four structure (III) units with itself and with one polyhydric (at least trihydric) molecule, e.g., a glycerol molecule, can yield structure (IV) infra and its isomeric equivalents:

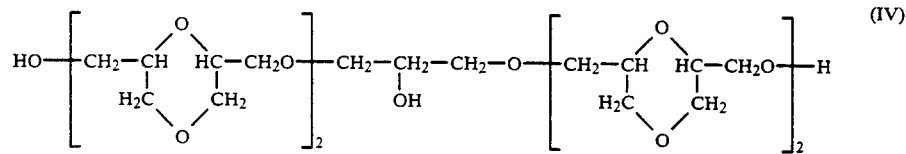

Analgous structures can be obtained from structures (I) (A), (I) B, and (I) E supra by polycondensation. Structures based on (E) supra will have 5-membered rings. Spectroscopic techniques cannot conveniently distinguish between the 5 or 6 membered rings.

Structure (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

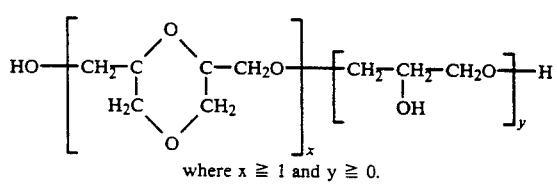

where $x \geq 1$ and $y \geq 0$.

Preparation of cyclicetherpolyols for the practice of this invention can be obtained by direct synthetic route. For example, starting with glycerol, chlorohydrin can be produced, which upon treatment with NaOH at elevated temperatures yields glycidol. This molecular structure cyclicizes at still higher temperature to yield bis hydroxymethyl 1,4-dioxane.

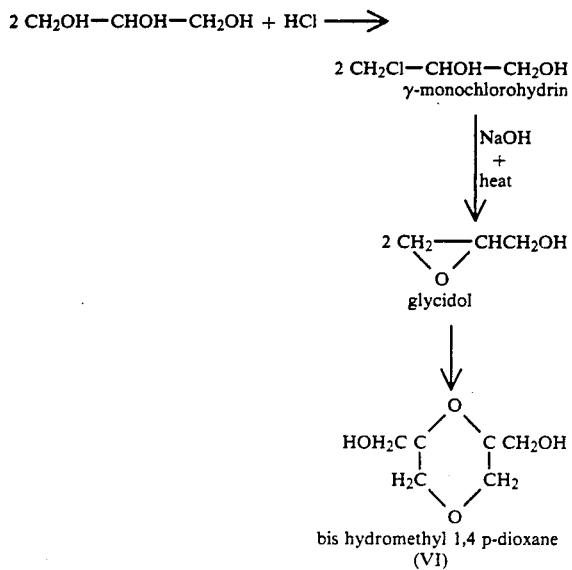

To make the higher molecular weight components from bis hydroxymethyl-1,4 p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range from 150° C. to 350° C. can be employed with pressures ranging from subatmospheric to several atmospheres. The vapor pressure of the water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which can enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols are quite suitable. Examples are butane triols, such as 1,2,4 butanetriol, pentane triols, such as 1,2,3 pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

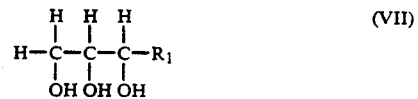

will yield several structures, one of which is illustrated by:

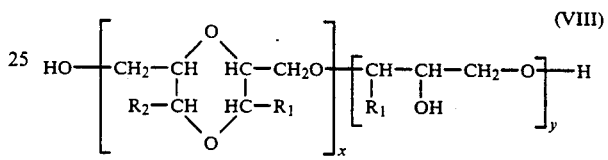

The $R_1$ group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols obtained from trihydric alcohols with more than three carbons include the following:

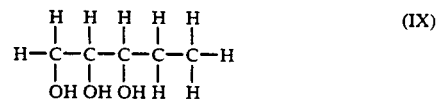

1, 2, 3-Pentanetriol

The following monocyclicdietherdiols of pentanetriol are obtained from Structure IX in accordance with the methods described supra:

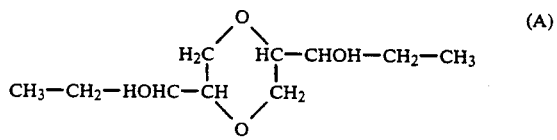

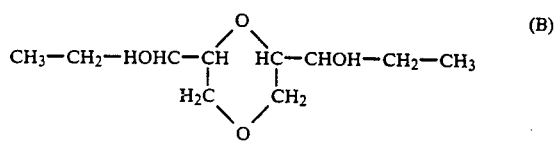

Both dimers (A) and (B) are obtained from Structure IX by reacting at carbons 1 and 2.

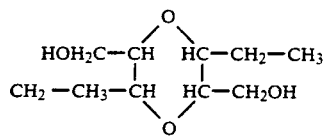
(C)

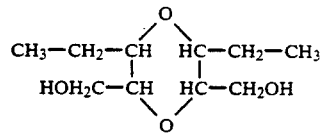
(D)

Both dimers (C) and (D) are obtained by reacting Structure (IX) at carbons 2 and 3.

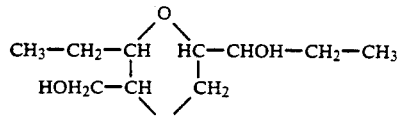
(E)

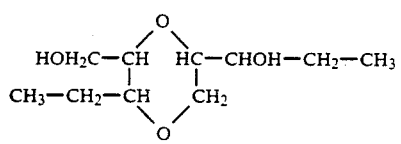
(F)

Further polycondensation of the cyclicetherdiols supra will yield polycyclicpolyetherpolyols with structures which depend on which hydroxyl groups are involved in the condensation reaction. For instance, reaction between Structures (X) A supra and (X) F supra will yield (XI) infra, a dicyclicpentaetherdiol of pentanetriol as follows. Obviously, a large number of possible polycondensed structures exist.

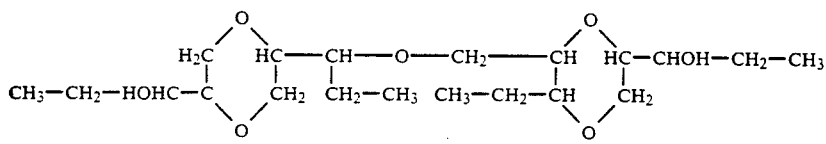
(XI)

The molecular weight of a typical composition which was found to provide excellent properties in the drilling fluid of this invention upon addition to a level of 2% w, had molecular weight parameters as determined infra. Number average molecular weight $M_n$ is shown by the following:

$$M_n = \frac{\sum\limits_i n_i M_i}{\sum\limits_i n_i} \geqq 1230$$

Two examples of polyglycerol structures which can undergo cyclization are molecules XII and XIII below:

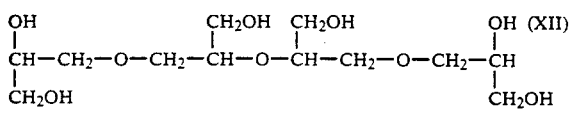
(XII)

$$\begin{array}{c}\text{CH}_2\text{OH} \quad \text{CH}_2\text{OH} \qquad\qquad \text{CH}_2\text{OH} \qquad \text{CH}_2\text{OH} \\ | \qquad\quad | \qquad\qquad\qquad | \qquad\qquad | \\ \text{CH}-\text{O}-\text{CH}-\text{CH}_2-\text{O}-\text{CH}-\text{CH}_2-\text{O}-\text{CH} \\ | \qquad\qquad\qquad\qquad\qquad\qquad\qquad\qquad\qquad | \\ \text{CH}_2\text{OH} \qquad\qquad\qquad\qquad\qquad\qquad\qquad \text{CH}_2\text{OH}\end{array}$$ (XIII)

The general formula of the cyclized polyglycerols is poorer in oxygen and hydrogen than the general composition $C_{3x} O_{2x+1} H_{6x+2}$. Cyclization of XII yields XIV, and cyclization of XIII yields XV.

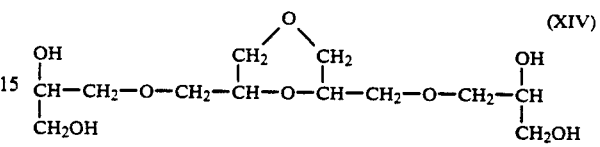
(XIV)

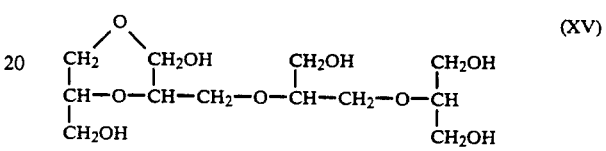
(XV)

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture.

The weight average molecular weight was found to be:

$$M_w = \frac{\sum\limits_i n_i M_i^2}{\sum\limits_i n_i M_i} \geqq 10550$$

This $M_w$ value represents GPC results expressed in terms of PEG numbers obtained by using two ultrahydrogel columns, a 250 angstroms column and a 120 angstroms column connected in series using water as solvent at 30° C. This molecular weight, weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample on those properties which depend on the size of the individual molecules, such as effectiveness in light scattering, or ability of the molecule to penetrate into small openings. Thus, a high $M_w$ would be beneficial if penetration of the molecules into the interplanar structure of layered clays in the formulation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP.

Most preferred samples of polycyclicpolyetherpolyols with beneficial effects on the properties of drilling fluids have been found to have $M_n$ values in the order of about 150 to about 2000 and $M_w$ values in the order of 1500 to 12000. The $M_n$ and $M_w$ values for POLS are 130-145 and 700-875, respectively, but POLS is superior to many other alcohols in carrying out the purposes of this invention.

Structural determination of mixtures using Mass Spectroscopy has yielded x values (see structures V and VIII supra) of 1 to 4 in portions of the sample not exceeding 14 glycerol units, thus indicating that in a significant portion of the sample $x \geq y/2$, although the invention is not limited to this theory. This procedure is limited with regard to the molecular weight of structures that it can determine, to molecules with about 50 carbon atoms.

In accordance with a highly preferred embodiment of the invention, polycyclipolyetherpolyols having superior characteristics are produced by thermal condensation of glycerol in distillation apparatus under conditions which allow water to be removed overhead, but not substantial amounts of glycerol or its dimers or trimers. A catalyst is required, preferably an alkali metal hydroxide, more preferably sodium hydroxide, in a preferred concentration of 0.5-1.5 percent by weight of the reaction mixture, and preferably including an alkali metal acetate, more preferably sodium acetate, in like or smaller amounts.

The mixture is heated, preferably between 150 and 350 mm Hg and free water is distilled off continuously, allowing the equilibrium limited reaction to proceed further and to completion. The glycerol will then begin to rise in temperature to about 210°-230° C. at 120-180 mm Hg, at which temperature the mixture refluxes, indicating the onset of reactions which produce water by condensation of the glycerol. By maintaining the pressure at up to 180 mm Hg, the glycerol, which may volatilize along with the water, is condensed in an overhead condenser, and preferably cooled by a coolant. The glycerol and its linear and cyclic dimers which form in the course of the volatilization process, are condensed and refluxed to the reacting mixture. Gradually the procedure results in an increase in the boiling point of the mixture, brought about by the continuous removal of water of condensation and by the increase of the molecular weight of the mixture.

As the degree of polymerization increases, and the water removed from the glycerol feed increases, the pressure over the mixture is gradually decreased externally, either in a continuous, preferably gradual mode, or at selected reaction temperatures. For example, it is possible to reduce the pressure to 120 mm Hg when the mixture reaches 250° C. at a pressure of 180 mm Hg. Alternatively, it is possible to control the pressure to diminish gradually by a known mechanical means.

The preferred way to achieve extensive dehydration without undesirable crosslinking and gelation of the polycyclicpolyetherpolyols is by the addition of small amounts of glycerol, at a later stage of the reaction, for example, when the reaction medium temperature has reached 270°-280° C. at a pressure of 50-100 mm Hg, preferably 60-90 mm Hg. Upon addition of 2-6 percent by weight of glycerol, basis final weight of glycerol added, at a point after removal, for example, of 0.8 moles of water per mole of glycerol, a drop in the temperature of the reaction mixture occurs, the drop being several degrees Centigrade or Fahrenheit. The drop is caused by the lower temperature of the glycerol being added, but more importantly indicates the endothermic nature of the reaction between glycerol molecules, or between glycerol molecules and added glycerol molecules, or between added glycerol molecules with reactive sites in the polymerizing mixture. For better effectiveness, the glycerol may be presaturated with alkaline metal hydroxide, e.g., sodium hydroxide.

Upon continued input of heat from an external source, the temperature of the reacting mixture rises to the previous highest level, or to a higher level, or to a somewhat lower level than a first high temperature, depending upon the molecular weight distribution of polycyclicpolyetherpolyols in the mixture. This procedure of incremental glycerol addition can be repeated a number of times, three being a convenient number. With three additions of glycerol the experimental reaction time between onset of reaction and its completion usually takes 5-10 hours depending on the temperature and pressure of additions and the amount of glycerol added each time. As the reaction approaches 85 percent completion it is suitable to combine glycerol additions with further reductions of pressure, going down to 30 mm Hg or even lower. As the reaction approaches completion, it turns from being highly endothermic to being thermally neutral, and at a dehydration approaching and exceeding 1.2 moles of water per mole of glycerol, it can become exothermic. This is a reflection of the propensity of the mixture to undergo rapid crosslinking of the complex polycyclicpolyetherpolyol structures. In order to avoid the occurrence of such an undesirable crosslinking reaction, it is preferred to buffer the reaction by adding a small amount of glycerol, for example, 0.3-0.9 percent or up to 1.5 percent by weight total. Preferably there is added 0.5 percent by weight of glycerol at a selected time or preferably at a point where the reaction is 96 percent complete, after removal of 1.12-1.15 moles of water per mole of glycerol in the reaction medium.

It has been found that the addition of minor amounts of epoxy resins to the reaction mixture are beneficial. Preferred epoxy resins are diglycidyl ethers, triglycidyl ethers, and tetraglycidyl ethers which, in the reacting glycerol medium, result in formation of higher molecular weight polycyclicpolyetherpolyols which substantially improve properties in connection with drilling fluid performance. Polycyclicpolyetherpolyols resulting from this process are characterized by bimodal molecular weight distribution, $M_w$ in excess of 50,000, said $M_w$ being determined in a three-column gel permeation chromatography, and being 0.5 to 10% w epoxy structures. The polycyclicpolyetherpolyols are further characterized by molecular structures which are no more than 20% free of associated cyclic formations.

Experimental results show that the impact of using multi-functional glycidyl ethers on the value of $M_n$ and on the performance, particularly as regards swelling of clays when the invention is used as a drilling fluid additive, is truly significant. Thus, when using 3.0% w Epon 828 (difunctional glycidyl ether) and 3.0% w Epon 1031 (tetrafunctional glycidyl ether) tradenames of Shell Oil Company, the $M_w$ values are correspondingly 78,015 and 151,000, and the swelling inhibition is the highest with Epon 1031, with good performance on fluid loss and on dispersion. The immediately preceding $M_w$ values are expressed in terms of true molecular weight in units of Daltons by using three ULTRAHYDROGEL (gel permeation chromatography) columns, a linear column, a 250 angstroms column and a 120 angstroms column in series, using water as the solvent at 30° C.

The alcohols or mixtures of alcohols of this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention. Some of the higher molecular weight alcohols may be very viscous liquids, or solids or have low solubility at the temperature conditions at the surface under which the drilling fluid is prepared. In these cases, the alcohols may be diluted with a suitable solvent which is soluble in the drilling fluid at the temperature conditions of drilling fluid preparation at the surface. Such suitable solvents may act both to lower viscosity and to increase solubility of the higher molecular weight alcohol for addition to the drilling fluid on the surface. Such solvents may be polyols of lower molecular weight, other alcohols such as methanol, ethanol, propanol, or isopropanol, water or mixtures of solvents and water.

The concentration of alcohol in the water phase used to prepare the drilling fluid of this invention will generally be at least about 2% by weight and preferably from about 2 to about 30% by weight based on the water phase and more preferably from about 5 to about 15% by weight; excellent results have been obtained with concentrations between about 10 and about 20% by weight. Preferably at least about 1% w of the alcohol is cyclicetherpolyol, or acyclic polyol, based on the total weight of the alcohol.

Various salts, preferably inorganic salts, are suitable for use with the invention, including but not limited to NaCl, NaBr, KCl, $CaCl_2$ and $NaNO_3$, $NaC_2H_3O_2$, $KCHO_2$, among which NaCl is preferred.

The concentration of salt in the water phase used to prepare the drilling fluid of this invention will be preferably at least about 3% and more preferably from about 5% to about 40% by weight based on the water phase, and even more preferably from about 8 to about 25% by weight; excellent results have been obtained with concentrations between about 10% and about 20% by weight.

The calcium compound of the drilling fluid additive of the invention is lime or gypsum or mixtures thereof. "Lime" includes calcium oxide, calcium hydroxide and mixtures thereof. "Gypsum" includes calcium sulfate, hydrated calcium sulfate and mixtures thereof.

The concentration of calcium compound in the water phase used to prepare the drilling fluid of this invention will generally be at least about 1 lb/bbl and preferably from about 15 lb/bbl of drilling fluid, and more preferably from about 1 to about 12 lb/bbl of drilling fluid; excellent results have been obtained with concentrations between about 3 and about 7 lb/bbl of drilling fluid.

Drilling fluids in accordance with the invention can be formed through the use of conventional techniques and apparatus normally employed in such operations. The drilling fluid additive may be added to the drilling fluid prepared in a holding tank on the surface according to a procedure commonly referred to as batch mixing. However, the additive may be injected continuously into the drilling fluid as it is prepared and pumped into the well.

The order of mixing the drilling fluid additives of the present invention with the drilling fluid is not absolutely critical. However, cost effective benefits could be realized if a specific order of addition was followed. For example, viscosity polymers and fluid loss additives will most likely yield more fully if added after lime or gypsum addition but before the polyol addition. Because these viscosifying and fluid loss additives are not shale stabilizing, the order of addition will have little or no effect on the shale stabilizing characteristics of the drilling fluid. The additives may be mixed individually, or in any combination, with the drilling fluid, or may be premixed in any combination prior to being mixed with the drilling fluid. Also, the location of mixing the drilling fluid additives with the drilling fluid is not critical.

The following examples are illustrative and not limiting of the present invention.

All hot rolling tests as described hereinafter were run with shale equilibrated to 50% humidity and sized between 6 and 10 mesh; 2.5 grams of shale was hot rolled with 100 milliliters of test solution at 150° F. for the indicated period of time. At the end of this time the shale/test solution slurry was sized on 10, 30, and 80 mesh screens. The samples were washed twice with approximately 100 milliliters of fresh water and/or isopropanol. The retained shale was then dried at 105° C. for 12 hours and weighed. The total retained represents that retained on all three screens. The amout retained divided by 2.5 grams times 100 is the percent retained.

Synergy calculations were performed in the following manner: predicted percent retained equals the sum of percent retained of each individual component minus fresh water plus the percent retained in fresh water.

LIME BASED DRILLING FLUID EXAMPLES

In Table 1 the characteristics of the shales used in the following examples are shown. Because of the large number of solutions tested, only the Prospect Grover shale 11521 feet was evaluated for all of the test solutions. However, some of the dispersion tests were run on other shales.

TABLE 1

CHARACTERIZATION OF SHALES

| Shale | MBT (meq/100 gm) | Total Clay (%) | Water Content (%) | Porosity (%) | Aw |
|---|---|---|---|---|---|
| Grover 11521 FT | 33.7 | 80.0 | 10.8 | 27.1 | 0.925 |
| 11484 FT | 35.0 | 48 | 12.7 | 26.2 | 0.92 |
| Pierre | 18.0 | 53.6 | 9.2 | 18.4 | 0.96 |
| Outcrop #6 | 14.6 | 16.9 | — | — | — |
| Hutton | 56.0 | 81.0 | — | 32.0 | — |
| Ventura 8404 | 22.0 | 55.2 | — | — | — |

Figure 2:
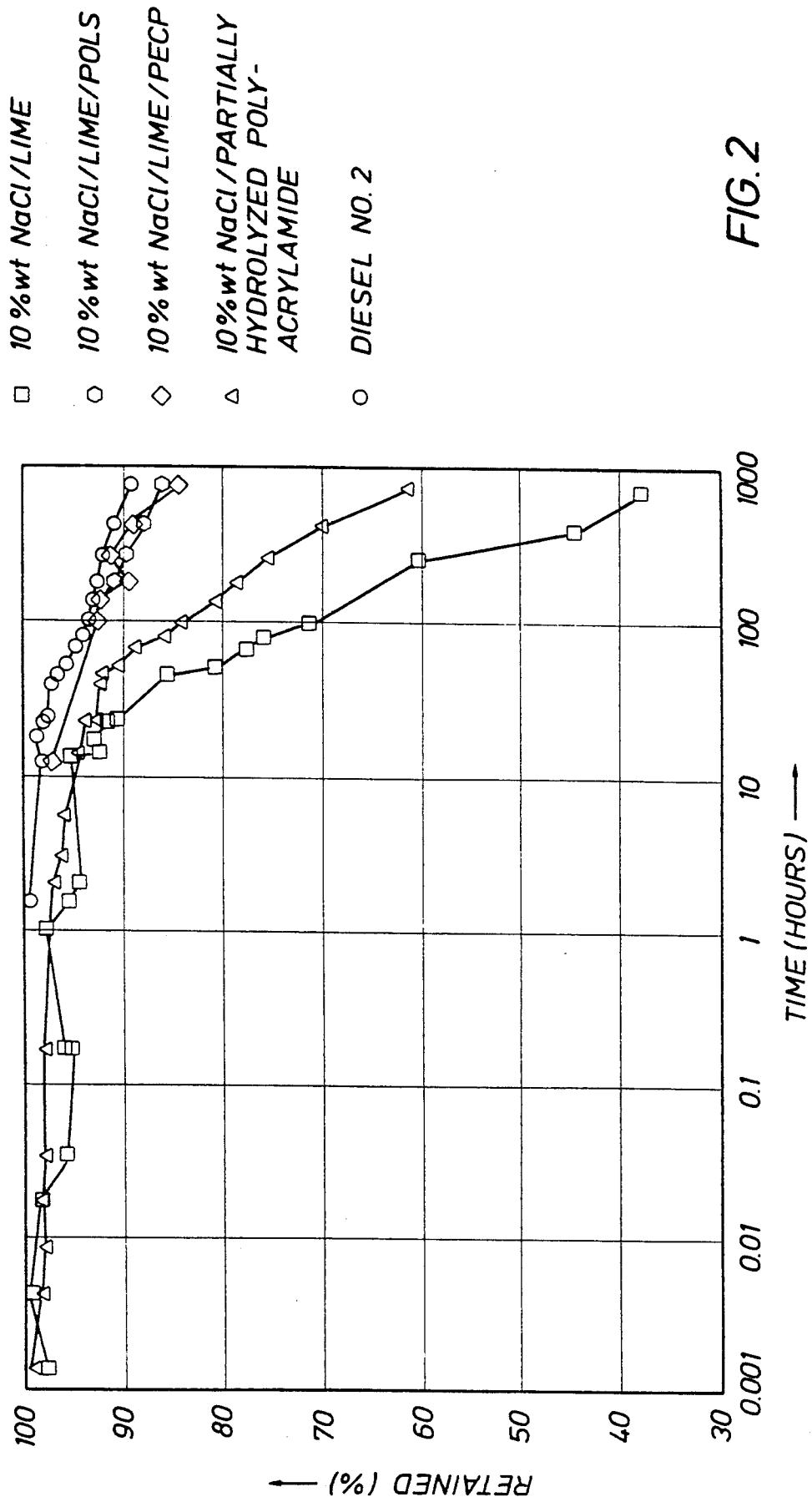
Figure 3:
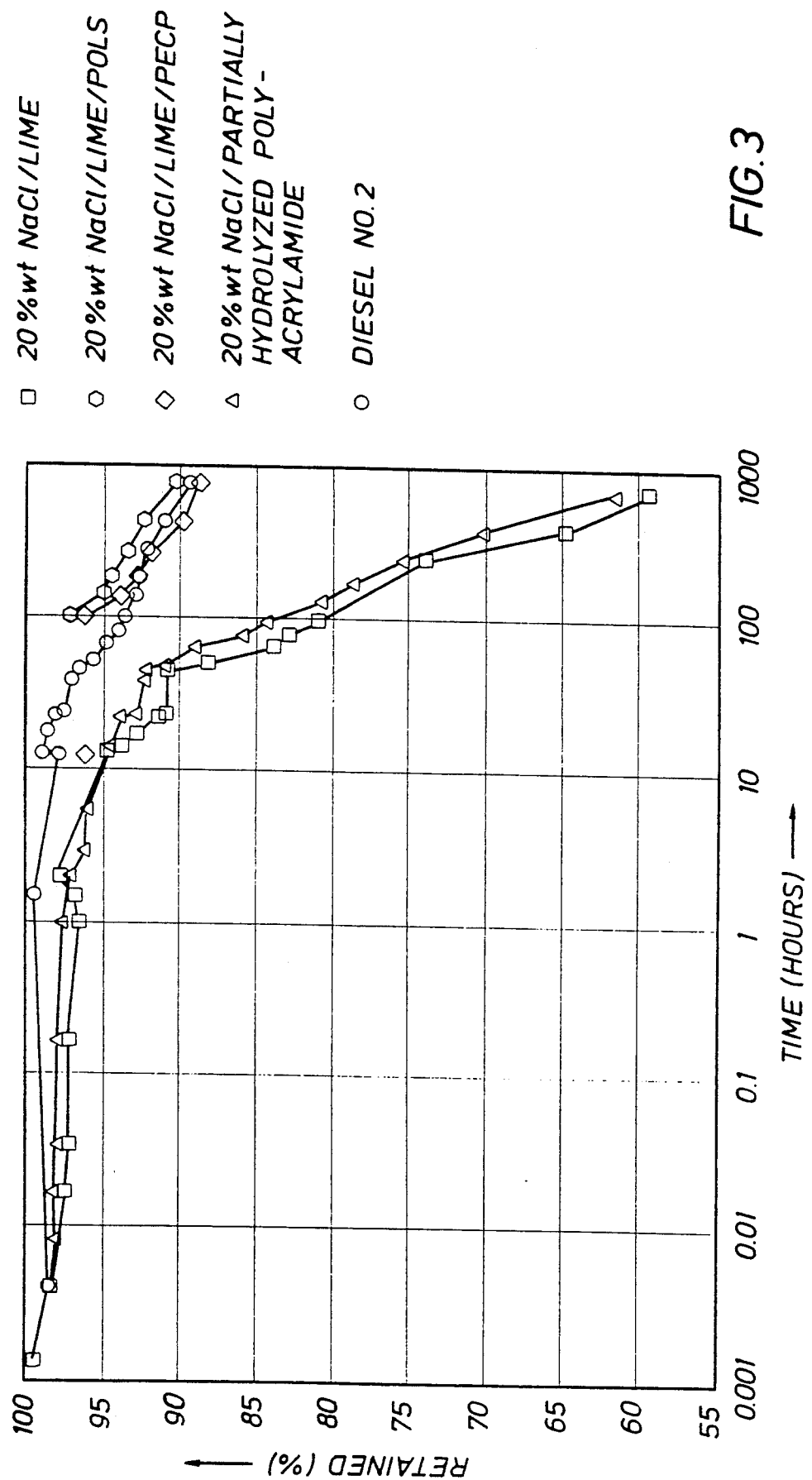

MBT = Methylene blue test essentially done as show in Standard Procedure for Field Testing Drilling Fluids, RP13B, 9/1/88
Aw = Water activity In FIGS. 1, 2 and 3 the effectiveness of adding a commercially available polyol mixture (herein referred to as POLS) or polyetherpolycyclicpyols prepared by Shell Chemical Company (herein referred to as PECP) are shown for different drilling fluid combinations. The POLS sample tested herein was analyzed to be 46.8% w propylene glycol with 16.6% w linear dimers, 17.5% w linear trimers, 3.8% w linear tetramers, 3.2% w linear pentamers, and 0.88% w linear hexamers of propylene glycol, with less than 0.5% w cyclics, 11% w water and 0.2 to 0.5% w Na+ and K+. A typical PECP sample tested was 0.16% w glycerol, 11.4% w P-dioxanes, 1.1% w cyclic trimers of glycerol, 4% w cyclic and dicyclic tetramers of glycerol, 2% w cyclic and dicyclic pentamers of glycerol, 2% w dicyclic and tricyclic hexamers of glycerol, 2% w dicyclic and tricyclic heptamers of glycerol, 3% w dicyclic and tricyclic octamers of glycerol, 4% w dicyclic and tricyclic nanamers of glycerol, 27% w polycyclicpolyetherpolyols having at least 30 carbon atoms and at least 2 cyclic ethers per molecule, 37.5% w water, and 0.5% NaCl. The pertinent comparisons are: 1) the effectiveness of the system as the salt content increases, 2) the effectiveness of the lime/salt system with the addition of alcohols, 3) the fact that the PECP product is better than the POLS product, and 4) the effectiveness of the high salt (10% w–20% w NaCl/lime/polyol) systems compared to oil base systems. Actual experimentation was done with Diesel No. 2 which is a more stringent comparison since water in oil base typically ranges from 5% to 50% by volume. The 20% w NaCl/PHPA (partially hydrolyzed polyacrylamide) system is shown to provide a base line for comparison of other drilling fluids to one of the better drilling fluids currently on the market.

The above described comparisons clearly demonstrate that the addition of an alcohol does improve the inhibition of cuttings dispersion. In addition, the higher the salt level, the better the inhibition of cuttings dispersion. The most important comparison shows that the salt/lime/alcohol water base system approaches the effectiveness of diesel base systems. To date this is the only water based drilling fluid that is known to compare favorably to oil base drilling fluids.

In FIG. 1, the improvement as a result of the addition of POLS or PECP to a seawater/lime base fluid is shown. Although the POLS and PECP samples appear essentially the same in results, the POLS was assayed at 18.7% by weight of water phase while the PECP samples were analyzed at 5% by weight of water phase. From this simple comparison it is apparent that the PECP product is superior to the POLS product for use in drilling fluids herein set forth. In FIGS. 2 and 3 the same observations can be made for the 10% w and 20% w NaCl/lime based systems. The addition of such alcohols makes a substantial improvement in the inhibition of dispersion, which begins to approach that observed for oil base drilling fluids observed for Diesel No. 2. Although the assay was run for over 700 hours, the differences in oil and the high salt/lime/alcohol systems are not significant. Dispersion would have to be allowed to occur much longer to discern differences.

Figure 4:
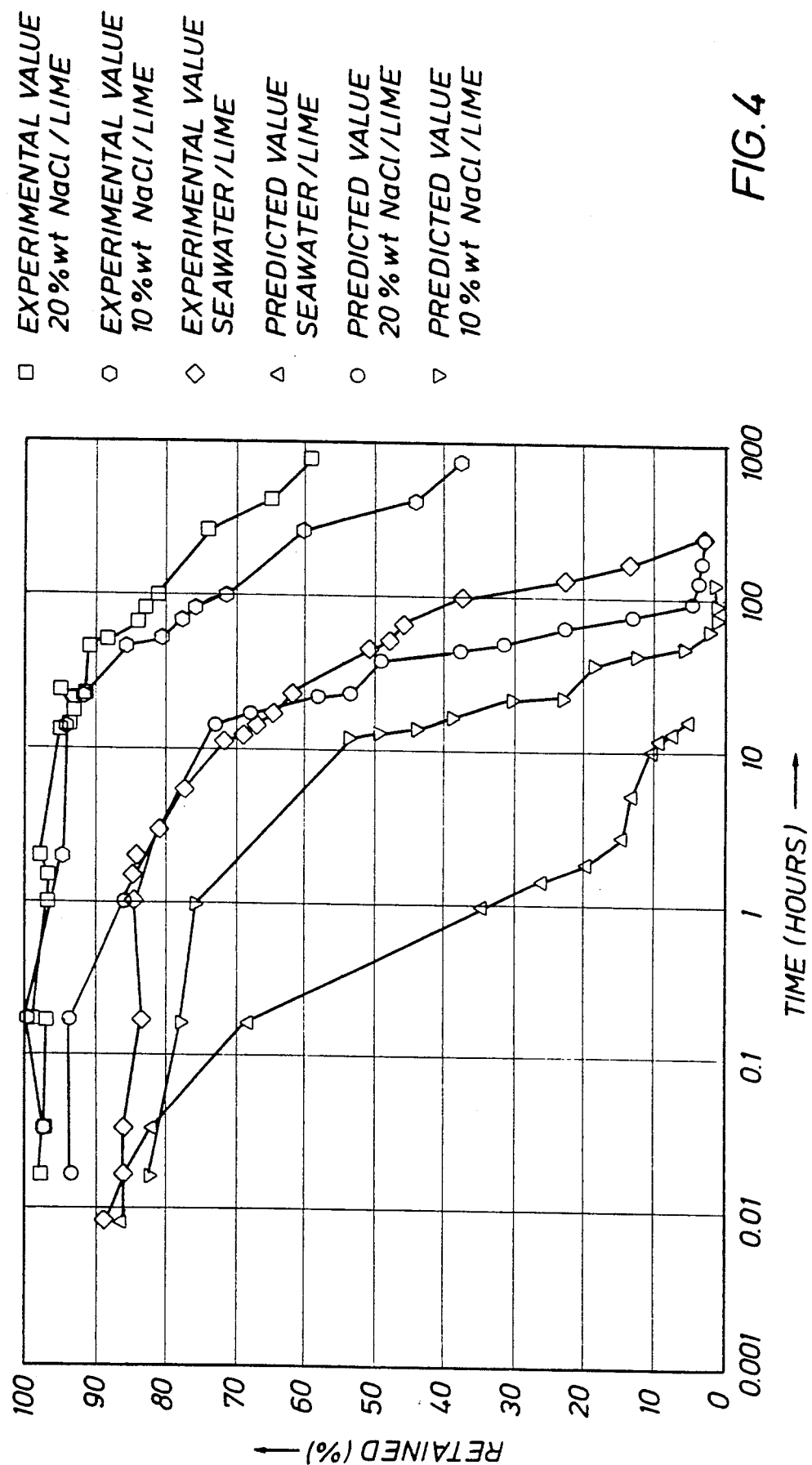

In FIG. 4, a comparison is shown between the experimental results and those results expected if the individual components (salt and lime) act in an additive manner. The expected effectiveness of lime and salt tested independently and added together is shown relative to the actual experimental combination of salt and lime. The results indicated that the combination of salt and lime is significantly better than expected from simple additive effects. This suggests that the two are acting on the shale in different ways. It is theorized that the salt stabilizes through ionic strength interactions or the lime results in the formation of calcium aluminosilicates (although the invention is not limited to this theory). From the results it is clear that the combination of salt and lime results in an improvement in cuttings stabilization and therefore, borehole stability.

Figure 5:
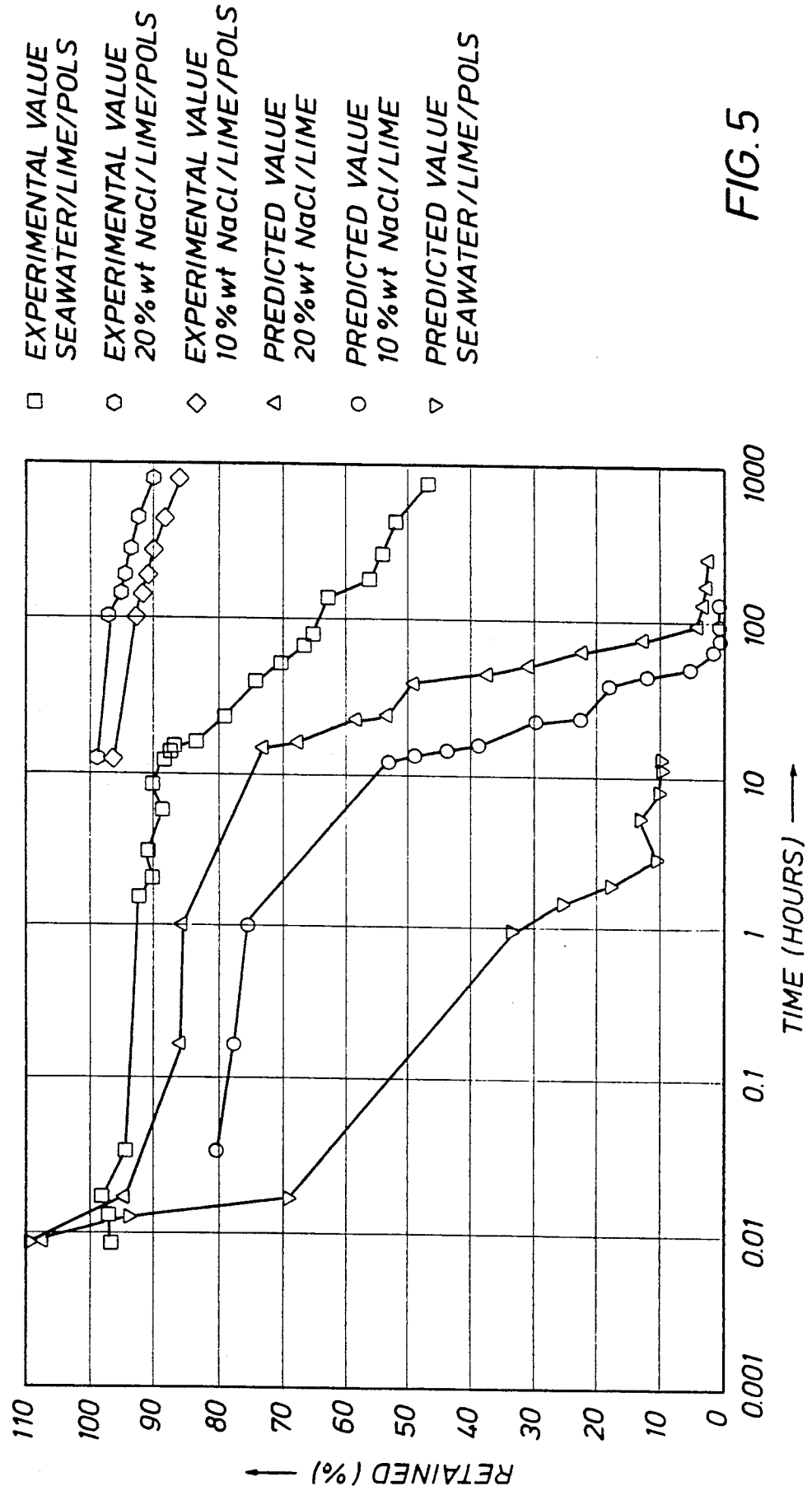

In FIG. 5 the relationship between salt, lime and POLS is shown. The predicted value is what would be expected if the individual components and fresh water were added together. The experimental values are what was actually observed when all three additives were tested together. As can be seen, the combination was synergistic. The three additives when tested together inhibited dispersion considerably more than what would have been expected when the additives were tested independently.

In Table 2 the concentration dependence for salt and alcohol in the presence of excess lime is shown for two shales. These results demonstrate that substantial improvements can be obtained with as little salt as 2.5% w and as low an alcohol concentration as 5% w. It is clear that PECP is superior for the fluids tested to POLS. In Table 3 results show that the effectiveness of this system is not specific to one or two shales. In all cases, synergistic interaction of salt, lime, and alcohol with the shale resulted in substantial improvement in the inhibition of dispersion.

In Table 4 some preliminary mud formulations are shown. The results demonstrate that a mud can be formulated that has reasonable properties.

The following general conclusions are drawn from the above examples: 1) lime base systems in the presence of salt provide significant inhibition of dispersion; 2) synergistic action between the lime, salt and shale occurs; 3) the addition of alcohols to the salt/lime base systems inhibits dispersion comparable to the 20% NaCl/partially hydrolyzed polyacrylamide systems and diesel oil; 4) the lime, salt and alcohol interact in a synergistic manner to inhibit dispersion; 5) the effectiveness of the salt, lime and alcohol combination is applicable to several types of shale; 6) relatively low concentrations of salt (2.5 wt %) and alcohols (5 wt %) in the presence of excess lime are effective; 7) mud formulations are possible which meet reasonable fluid loss and rheology requirements.

GYPSUM BASED DRILLING FLUID EXAMPLES

In Table 1 the characteristics of the shales used for gypsum base drilling fluids are shown. The majority of the work has been done on only one shale due to the large number of solution permutations (Grover 11,521 feet). However, the other shales provide a reasonable representation of different shales with varying reactivity.

TABLE 2

| CONCENTRATION DEPENDENCE OF SALT AND ALCOHOL | | | | | | | | | | | | | | | |
|---|---|---|---|---|---|---|---|---|---|---|---|---|---|---|---|
| Formulation | | | | | | | | | | | | | | | |
| 1 | 2 | 3 | 4 | 5 | 6 | 7 | 8 | 9 | 10 | 11 | 12 | 13 | 14 | 15 | 16 |
| 200-Hour Hot Roll at 150° F. of Grover 11,521 feet | | | | | | | | | | | | | | | |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) POLS | 0 | 0 | 0 | 0 | 5.0 | 5.0 | 5.0 | 5.0 | 10.0 | 10.0 | 10.0 | 10.0 | 20.0 | 20.0 | 20.0 | 20.0 |

TABLE 2-continued

CONCENTRATION DEPENDENCE OF SALT AND ALCOHOL

| Formulation | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Lime (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 29.8 | 33.5 | 62.6 | 74.2 | 36.8 | 41.2 | 75.2 | 82.6 | 45.2 | 65.9 | 81.2 | 88.9 | 55.9 | 82.9 | 92.8 | 93.8 |
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) | 0 | 0 | 0 | 0 | 2.5 | 2.5 | 2.5 | 2.5 | 5.0 | 5.0 | 5.0 | 5.0 | 10.0 | 10.0 | 10.00 | 10.0 |
| PECP Lime (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 29.8 | 33.5 | 62.2 | 74.2 | 42.9 | 47.8 | 81.9 | 85.9 | 51.6 | 71.2 | 91.2 | 92.5 | 61.2 | 88.9 | 95 | 97.1 |

200-Hour Hot Roll at 150° F. of Grover 11,484 feet

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) | 0 | 0 | 0 | 0 | 5.0 | 5.0 | 5.0 | 5.0 | 10.0 | 10.0 | 10.0 | 10.0 | 20.0 | 20.0 | 20.0 | 20.0 |
| POLS Lime | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 31.2 | 34.5 | 61.5 | 75.1 | 37.4 | 40.9 | 76.2 | 83.1 | 46.1 | 66.1 | 80.2 | 89.4 | 56.1 | 83.1 | 93.2 | 94.1 |
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) | 0 | 0 | 0 | 0 | 2.5 | 2.5 | 2.5 | 2.5 | 5.0 | 5.0 | 5.0 | 5.0 | 10.0 | 10.0 | 10.0 | 10.0 |
| PECP Lime (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 31.2 | 34.2 | 63.4 | 74.1 | 73.0 | 48.9 | 82.1 | 86.4 | 52.3 | 80.2 | 92.3 | 93.5 | 60.1 | 89.4 | 96.1 | 98.9 |

% w is weight of additive divided by weight of formulation × 100.
lb/bbl is pounds of additive per barrel of formulation.

TABLE 3

EVALUATION OF DIFFERENT SHALES

| Shale | Time (hr) | Fresh Water | 10% w NaCl/Lime/10% POLS Total Percent Retained | | | | | 10% w NaCl/Lime/5% PECP Total Percent Retained | | | | |
|---|---|---|---|---|---|---|---|---|---|---|---|---|
| | | | 10% w NaCl | Lime | Alcohol 10% | Sum | Combination | 10% w NaCl | Lime | Alcohol 5% w | Sum | Combination |
| Pierre (Utah) | 16 | 5.1 | 25.6 | 1.2 | 11.3 | 27.9 | 85.9 | 25.6 | 1.2 | 12.6 | 29.2 | 95.8 |
| West Delta (Gulf of Mexico) | 10 | 0.1 | 21.6 | 0.8 | 5.2 | 27.4 | 76.8 | 21.6 | 0.8 | 6.9 | 29.1 | 81.6 |
| Hutton (North Sea) | 100 | 42.5 | 65.2 | 41.5 | 46.9 | 68.6 | 89.6 | 65.2 | 41.5 | 47.1 | 68.8 | 95.6 |
| Ventura 8404 (California) | 16 | 33.5 | 56.6 | 41.4 | 37.9 | 69.0 | 91.2 | 56.6 | 41.5 | 38.9 | 70.0 | 98.9 |
| Outcrop Number Six (Texas) | 10 | 18.2 | 31.2 | 7.5 | 25.6 | 27.9 | 71.2 | 31.2 | 7.5 | 26.6 | 28.9 | 85.6 |
| Mustang Island (Gulf of Mexico) | 1 | 0 | 13.5 | 0 | 5.6 | 19.1 | 41.2 | 13.5 | 0 | 6.1 | 19.6 | 52.9 |

The alcohol and salt concentrations are percent by weight based on weight of formulation, with lime at 4.0 lb/bbl of formulation. Two and one-half grams of sized 6 to 10 mesh cuttings were added to the test solutions (fresh water, 10% w NaCl, lime, alcohol) and hot rolled at 150° F. for for the times indicated in the table. The dispersed sample was then screened over 10, 30, and 80 mesh screens. The percent retained is calculated by dividing the amount retained on a given screen or the total by 2.5 grams and multiplying by 100 to obtain a percentage. The fresh water, fresh water and lime, and fresh water and alcohol samples were tested for the times indicated in the table. The combination of fresh water, salt, lime, and alcohol was tested for 2015 hours at 150° F.
Tests for Synergy (sum) were calculated by taking the percent retained of the appropriate test solution and subtracting the fresh water value for that specific time. This was then added to any other individual components minus fresh water to obtain the theoretical effects of each component. To this sum, the fresh water background was added back to make it comparable to the experimental result where the additives were tested in combination.
Example calculation:

Predicted percent retained for salt/alcohol/lime = [ (Percent retained in a 20% salt minus fresh water percent retained) plus (Percent retained in lime minus fresh water) plus (Percent retained in alcohol minus fresh water) ] PLUS percent retained in fresh water

TABLE 4

LIME/SALT/ALCOHOL MUD FORMULATIONS

| Mud Formulation | I | II | III | IV | V | VI | VII | VIII | IX | X | XI | XII | XIII | XIV |
|---|---|---|---|---|---|---|---|---|---|---|---|---|---|---|
| Seawater/NaCl (90/10% w/w) (ml) | — | 263.8 | 234.5 | 235.1 | 210.8 | — | 263.8 | 234.5 | 235.1 | 210.8 | 234.5 | 234.5 | 234.5 | 234.5 |
| Seawater/NaCl (80/20% w/w) (ml) | 241.5 | — | — | — | — | 241.5 | — | — | — | — | — | — | — | — |
| Bentonite (gm) | 20.0 | 20.0 | 20.0 | 20.0 | 20.0 | 20.0 | 20.0 | 20.0 | 20.0 | 20.0 | 20.0 | 20.0 | 20.0 | 20.0 |
| Drill Soldis (gm) | 25.0 | 25.0 | 25.0 | 25.0 | 25.0 | 25.0 | 25.0 | 25.0 | 25.0 | 25.0 | 25.0 | 25.0 | 25.0 | 25.0 |
| Morex (gm)[1] | 4.0 | 4.0 | 4.0 | 4.0 | 4.0 | 4.0 | 4.0 | 4.0 | 4.0 | 4.0 | 4.0 | 4.0 | 4.0 | 4.0 |
| Lime (gm) | 4.0 | 4.0 | 4.0 | 4.0 | 4.0 | 4.0 | 4.0 | 4.0 | 4.0 | 4.0 | 4.0 | 4.0 | 4.0 | 4.0 |
| Barite (gm) | 125.6 | 158.6 | 151.0 | 296.0 | 409.7 | 125.6 | 158.6 | 151.0 | 296.0 | 409.7 | 151.0 | 151.0 | 151.0 | 151.0 |
| Biozan (gm)[2] | 3.0 | 2.5 | 2.5 | 2.0 | 2.0 | 3.0 | 2.5 | 2.5 | 2.0 | 2.0 | 2.5 | 2.5 | 2.5 | 2.5 |
| Starch (gm) | 6.0 | 6.0 | 6.0 | 6.0 | 6.0 | 6.0 | 6.0 | 6.0 | 6.0 | 6.0 | 6.0 | 6.0 | — | — |
| Polydrill (gm)[3] | 6.0 | 6.0 | 6.0 | 6.0 | 6.0 | 6.0 | 6.0 | 6.0 | 6.0 | 6.0 | — | — | 6.0 | 6.0 |
| POLS (gm) | 71.4 | 36.9 | 73.9 | 31.7 | 28.4 | — | — | — | — | — | 73.9 | — | 73.9 | — |
| PECP (gm) | — | — | — | — | — | 71.4 | 36.9 | 73.9 | 31.7 | 28.4 | — | 73.9 | — | 73.9 |
| Density (ppg) | 12.5 | 12.5 | 12.5 | 15.0 | 17.0 | 12.5 | 12.5 | 12.5 | 15.0 | 17.0 | 12.5 | 12.5 | 12.5 | 12.5 |

TABLE 4-continued

LIME/SALT/ALCOHOL MUD FORMULATIONS

| | Mud Formulation | | | | | | | | | | | | | |
|---|---|---|---|---|---|---|---|---|---|---|---|---|---|---|
| | I | II | III | IV | V | VI | VII | VIII | IX | X | XI | XII | XIII | XIV |
| PECP is 50% active. | | | | | | | | | | | | | | |
| Muds were hot rolled at 150° F. for 16 hours. | | | | | | | | | | | | | | |
| 600 rpm | 109.0 | 110.0 | 63.0 | 131.0 | 75.0 | 111.0 | 115.0 | 65.0 | 111.0 | 75.0 | 64.0 | 66.0 | 92.0 | 97.0 |
| 300 rpm | 70.0 | 68.0 | 36.0 | 76.0 | 45.0 | 75.0 | 69.0 | 41.0 | 64.0 | 45.0 | 41.0 | 40.0 | 55.0 | 58.0 |
| Plastic viscosity (cps) | 39.0 | 42.0 | 27.0 | 55.0 | 30.0 | 36.0 | 46.0 | 24.0 | 47.0 | 30.0 | 23.0 | 26.0 | 37.0 | 39.0 |
| Yield point (lb/100 ft$^2$) | 31.0 | 26.0 | 9.0 | 21.0 | 15.0 | 39.0 | 23.0 | 17.0 | 17.0 | 15.0 | 18.0 | 14.0 | 18.0 | 19.0 |
| 10-second gel | 8.0 | 7.0 | 2.0 | 4.0 | 6.0 | 7.0 | 5.0 | 3.0 | 2.0 | 6.0 | 3.0 | 4.0 | 8.0 | 9.0 |
| 10-minute gel | 16.0 | 14.0 | 3.0 | 14.0 | 15.0 | 13.0 | 11.0 | 7.0 | 11.0 | 15.0 | 5.0 | 8.0 | 18.0 | 21.0 |
| API fluid loss (ml) | 2.5 | 1.5 | 2.5 | 3.0 | 5.5 | 1.1 | 1.0 | 1.0 | 1.5 | 2.0 | 5.8 | 3.5 | 7.2 | 5.5 |
| HPHT fluid loss, 160° F. (ml) | 5.8 | 4.7 | 5.8 | 6.0 | 11.4 | 2.8 | 2.6 | 2.9 | 3.5 | 3.0 | 12.5 | 6.4 | 14.0 | 7.8 |
| HPHT cake thickness (32nd of inch) | 3.0 | 2.0 | 2.0 | 3.0 | 4.0 | 1.0 | 1.0 | 2.0 | 2.0 | 2.0 | 4.0 | 3.0 | 5.0 | 4.0 |

Muds were hot rolled at 150° F. for 16 hours. % w is weight of additive divided by weight of formulation × 100.
[1]Water-soluble carbohydrate polymer - trademark of Grain Processing Corp.
[2]Biopolymer - trademark of Kelco Rotary.
[3]Synthetic polymer - trademark of SKW Chemicals.

Figure 6:
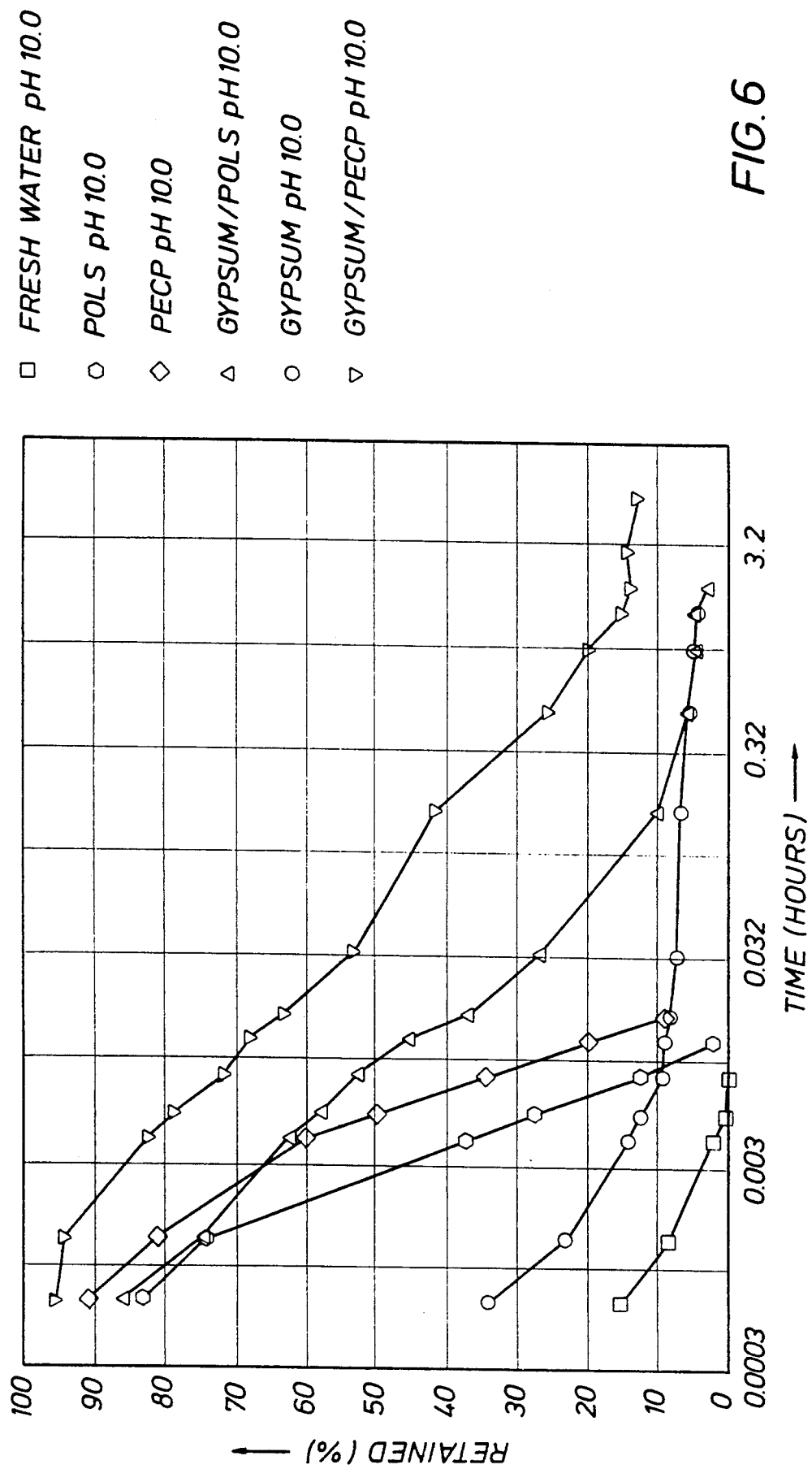

In FIG. 6 the hot rolling dispersion curves for fresh water with or without gypsum and alcohol are shown. The Grover 11521 ft shale disperses very rapidly in fresh water. The addition of gypsum (4 lb/bbl) reduces the rate of dispersion significantly. For all of the dispersion tests run with gypsum, 4 lb/bbl was used. However, when either the POLS or PECP was added, dramatic reductions in the rate of dispersion were observed. The PECP was found to be superior to the POLS for this mud system as well.

Figure 7:
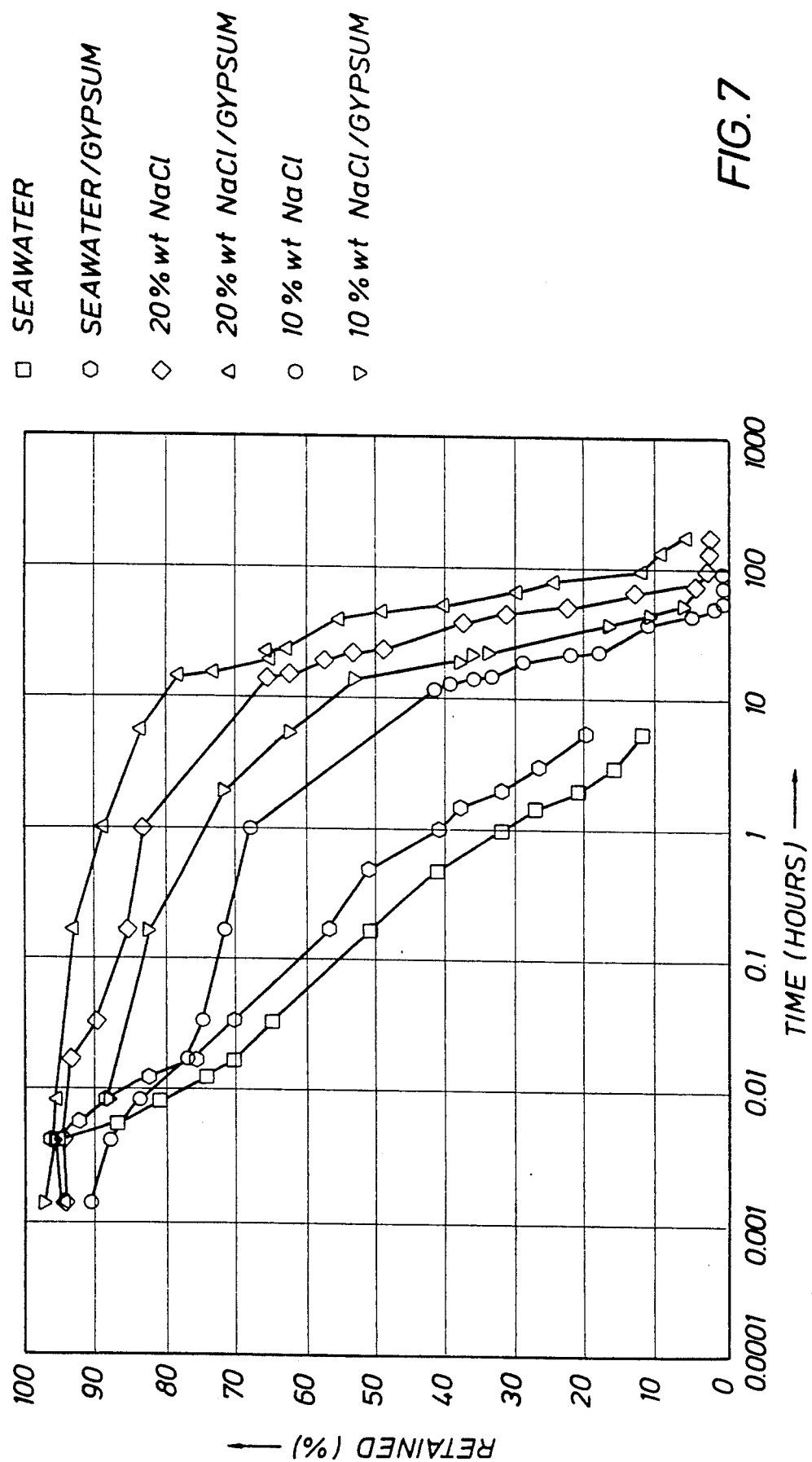
Figure 8:
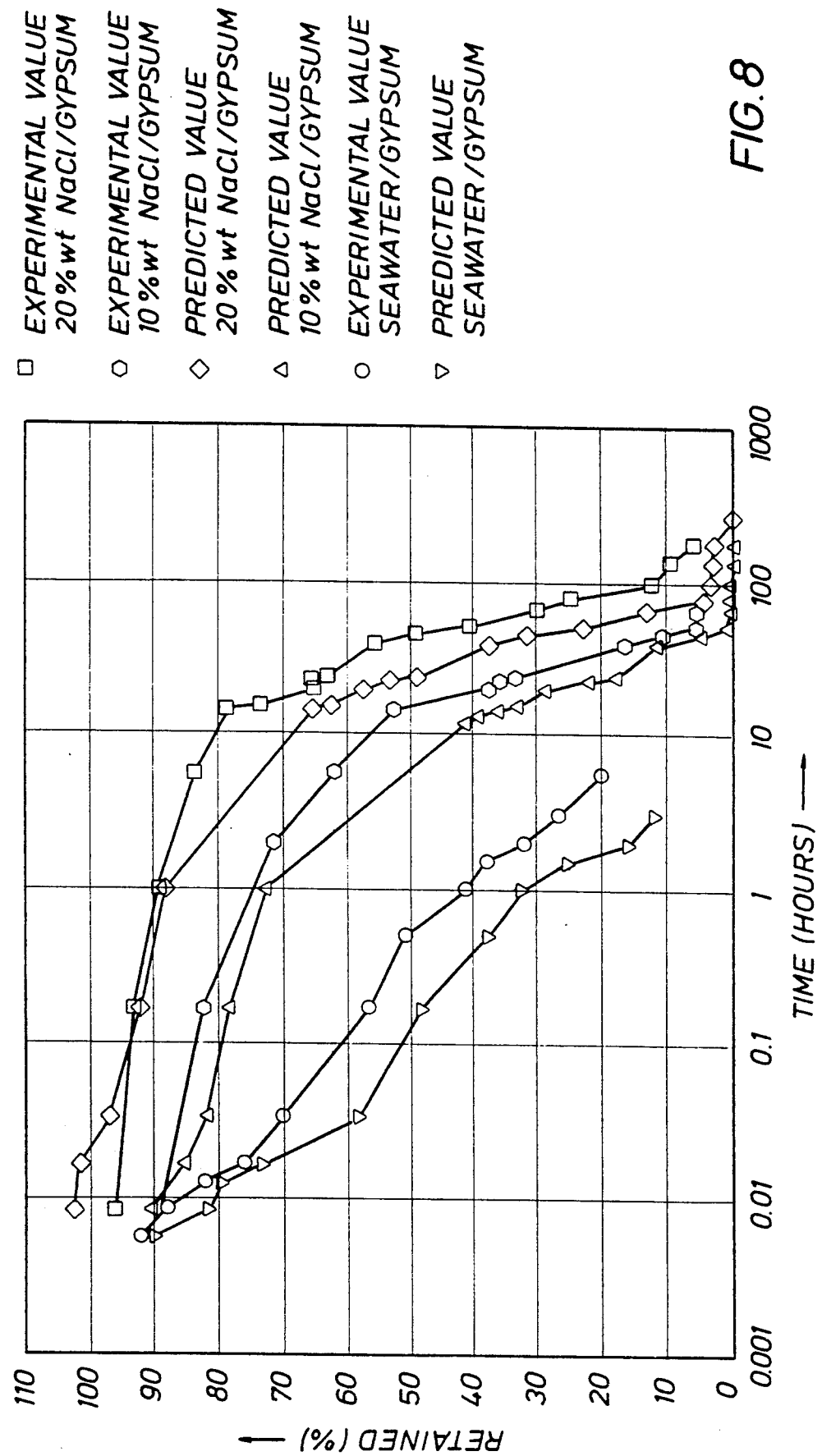

In FIG. 7 similar results are observed when the base fluid is seawater, 10% NaCl or 20% NaCl. The addition of gypsum to any of these fluids reduced the rate of dispersion. Although the improvement is not dramatic, the use of salt and gypsum in combination is synergistic (FIG. 8). That is, the sum of the precent retained of each of the salt and gypsum in fresh water is not as effective as the additives are tested together.

Figure 9:
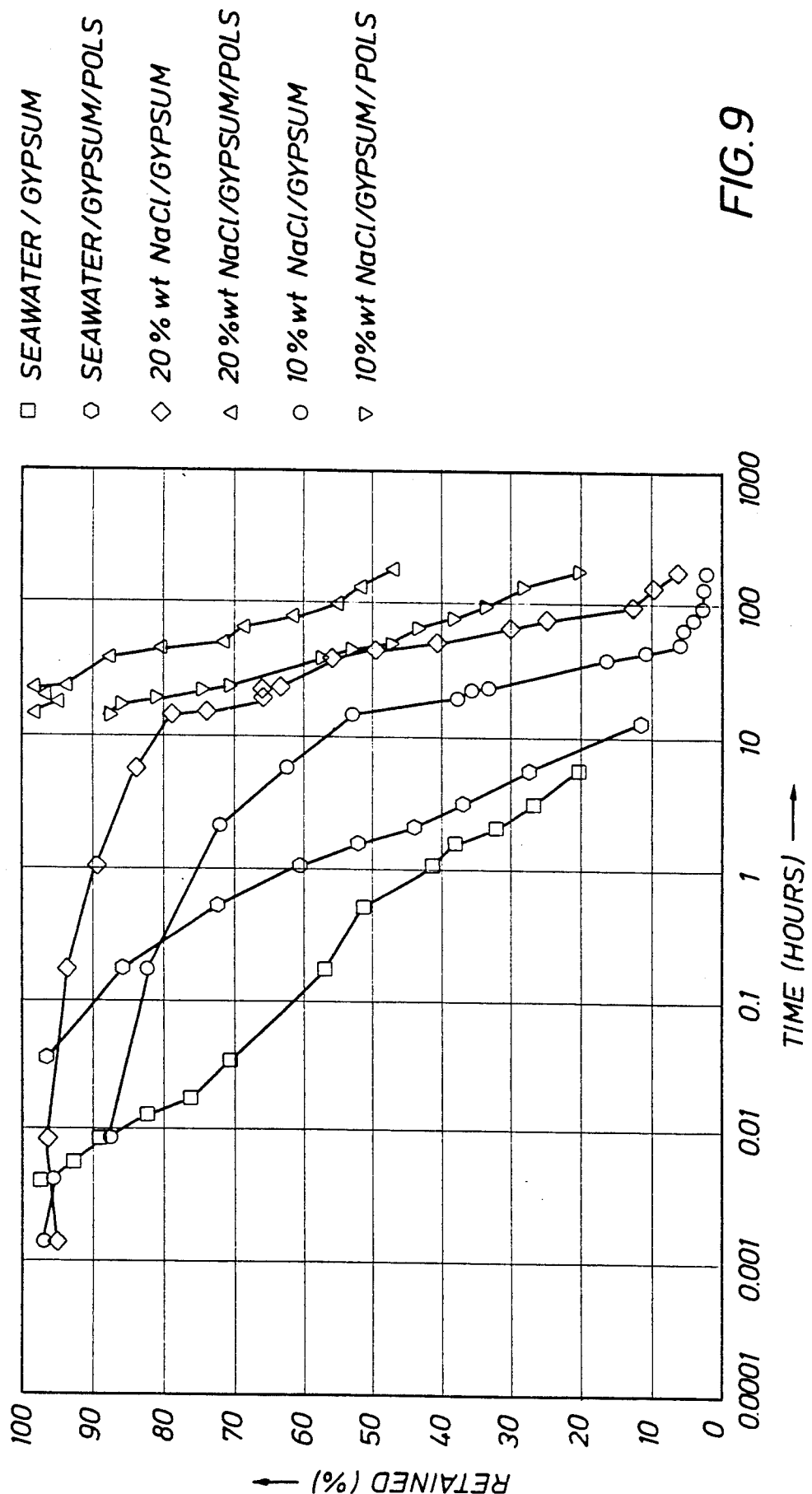
Figure 10:
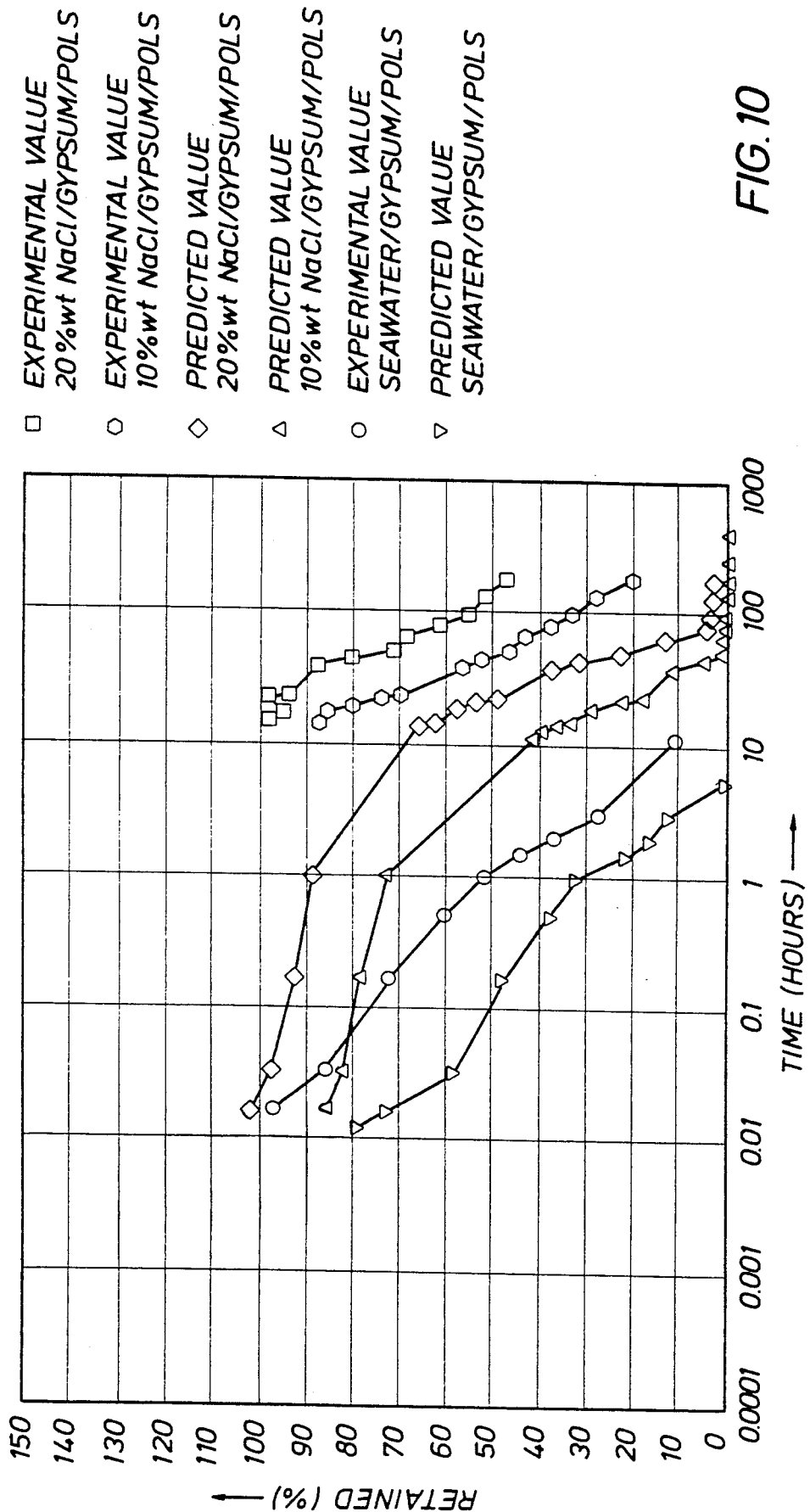

In FIG. 9 the effect of adding POLS was evaluated in the salt/gypsum systems. As shown, the addition of 18.68 wt % POLS resulted in a significant improvement for each of the salt systems. In FIG. 10 the synergy analysis shows that the presence of alcohol is synergistic with the gypsum and salt for inhibiting dispersion.

In Table 5 the dispersion of Grover 11521 or 11484 was investigated as a function of salt and alcohol concentrations with gypsum being in excess. The results demonstrate that the effect of salt or alcohol is concentration dependent. In addition, it is also apparent that PECP is superior to POLS for this use.

The effect of 10% NaCl, gypsum and POLS or PECP on dispersion of several different shales is shown in Table 6. The results demonstrate that the benefits noted above can be seen for different shales and that PECP again is superior to POLS. These data indicate that this system is applicable to a wide range of shale types.

TABLE 5

CONCENTRATION DEPENDENCE OF SALT AND ALCOHOL

| | Formulation | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 200-Hour Hot Roll at 150° F. of Grover 11,521 feet | | | | | | | | | | | | | | | | |
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) | 0 | 0 | 0 | 0 | 5.0 | 5.0 | 5.0 | 5.0 | 10.0 | 10.0 | 10.0 | 10.0 | 20.0 | 20.0 | 20.0 | 20.0 |
| POLS | | | | | | | | | | | | | | | | |
| Gypsum (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 0 | 0 | 3.1 | 5.5 | 0 | 1.2 | 7.5 | 11.5 | 0 | 4.2 | 14.5 | 25.8 | 0 | 8.8 | 22.1 | 41.5 |
| NaCl (%) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (%) | 0 | 0 | 0 | 0 | 5.0 | 5.0 | 5.0 | 5.0 | 10.0 | 10.0 | 10.0 | 10.0 | 20.0 | 20.0 | 20.0 | 20.0 |
| PECP | | | | | | | | | | | | | | | | |
| Gypsum (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 0 | 0 | 4.0 | 6.0 | 0 | 0 | 8.0 | 15.5 | 0 | 11.2 | 22.2 | 34.4 | 0 | 15.2 | 55.1 | 65.8 |
| 200-Hour Hot Roll at 150° F. of Grover 11,484 feet | | | | | | | | | | | | | | | | |
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) | 0 | 0 | 0 | 0 | 5.0 | 5.0 | 5.0 | 5.0 | 10.0 | 10.0 | 10.0 | 10.0 | 20.0 | 20.0 | 20.0 | 20.0 |
| POLS | | | | | | | | | | | | | | | | |
| Gypsum (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 0 | 0 | 4.5 | 6.8 | 0 | 2.3 | 8.4 | 12.7 | 0 | 5.6 | 15.7 | 27.8 | 0 | 10.4 | 23.7 | 45.9 |
| NaCl (% w) | 2.5 | 5.0 | 10.0 | 20.0 | 2.5 | 5.0 | 10.0 | 20.0 | 2.5 | 5.0 | 10.0 | 20.0 | 2.5 | 5.0 | 10.0 | 20.0 |
| Alcohol (% w) | 0 | 0 | 0 | 0 | 5.0 | 5.0 | 5.0 | 5.0 | 10.0 | 10.0 | 10.0 | 10.0 | 20.0 | 20.0 | 20.0 | 20.0 |
| PECP | | | | | | | | | | | | | | | | |
| Lime (lb/bbl) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Percent Retained | 0 | 0 | 5.1 | 7.4 | 0 | 3.4 | 11.0 | 16.0 | 0 | 9.7 | 24.0 | 36.1 | 0 | 14.9 | 57.9 | 63.2 | bbl are barrels of formulation.
% w is weight of additive divided by weight of formulation × 100

TABLE 6

EVALUATION OF DIFFERENT SHALES

TABLE 6-continued

| Shale | Time (hr) | Fresh Water | 10% w NaCl/Gypsum/POLS Total Percent Retained | | | | | 10% w NaCl/Gypsum/PECP Total Percent Retained | | | | |
|---|---|---|---|---|---|---|---|---|---|---|---|---|
| | | | 10% w NaCl | Gypsum 4.0 lb/bbl | Alcohol 10% w | Predicted Sum | Combination | 10% NaCl | Gypsum 4.0 lb/bbl | Alcohol 10% w | Predicted Sum | Combination |
| Pierre (Utah) | 16 | 5.1 | 25.6 | 7.5 | 11.3 | 34.2 | 48.9 | 25.6 | 7.5 | 13.3 | 36.2 | 55.9 |
| West Delta (Gulf of Mexico) | 10 | 0.1 | 21.6 | 2.3 | 5.2 | 28.9 | 48.8 | 21.6 | 2.3 | 7.0 | 30.7 | 53.9 |
| Hutton (North Sea) | 100 | 42.5 | 65.2 | 45.5 | 46.9 | 72.6 | 89.4 | 65.2 | 45.5 | 51.9 | 77.6 | 91.9 |
| Ventura 8404 (California) | 16 | 33.5 | 56.6 | 37.2 | 37.9 | 64.7 | 87.8 | 56.6 | 37.2 | 41.2 | 68.0 | 95.5 |
| Outcrop No. Six (Texas) | 10 | 18.2 | 31.2 | 23.8 | 25.6 | 44.2 | 47.9 | 31.2 | 23.8 | 28.7 | 47.3 | 65.8 |
| Mustang Island (Gulf of Mexico) | 1 | 0 | 13.5 | 1.2 | 5.6 | 20.3 | 31.2 | 13.5 | 1.2 | 7.9 | 22.6 | 40.0 |

The fresh water, fresh water and lime, and fresh water and alcohol samples were tested for the times indicated in the table.
The combination of fresh water, salt, lime, and alcohol was tested for 200 hours at 150° F. The alcohol and salt concentrations are percent by weight based on weight of formulation, with gypsum tested at 4.0 lb/bbl. of formulation.
Tests for Synergy (Sum) were calculated by taking the percent retained of the appropriate test solution and subtracting the fresh water value for that specific time. This was then added to any other individual components minus fresh water to obtain the theoretical sum of the additive effects of each component. To this sum, the fresh water background was added back to make it comparable to the experimental result where the additives were tested in combination.
Example calculation:

Predicted percent retained for salt/alcohol ( = [ (Percent retained in 20% w salt minus fresh water percent retained) plus (Percent retained in gypsum minus fresh water) plus (Percent retained in alcohol minus fresh water) ] PLUS percent retained in fresh water Several conclusions can be drawn from the preceding examples: 1) The addition of higher concentrations of salt improves the effectiveness of gypsum for stabilizing cuttings; 2) the presence of alcohols in a salt/gypsum system reduces the rate of dispersion even more; 3) the application of salt and/or alcohols to a gypsum system is applicable to a variety of shales.

The following examples provide drilling fluid compositions which are formulated for one barrel and which further demonstrate the invention.

| 1 FRESH WATER | | 2 SEA WATER | | 3 SEA WATER/NaCl (90%/10%) | |
|---|---|---|---|---|---|
| NaCl lbs | 37.70 | | | | |
| Density (ppg) | 15.00 | Density (ppg) | 15.00 | Density (ppg) | 12.50 |
| Base Fluid (bbl) | 0.65 | Base Fluid (bbl) | 0.66 | Base Fluid (bbl) | 0.77 |
| POLS (bbl) | 0.07 | | | | |
| | | PECP (bbl) | 0.07 | Bis-hydroxymethyl 1,4-P-dioxane (bbl) | 0.09 |
| Lime (lbs) | 4.00 | Lime (lbs) | 4.00 | Lime (lbs) | 4.00 |
| Drill Solids (lbs) | 45.00 | Drill Solids (lbs) | 45.00 | Prehydrated Bentonite (lbs) | 10.00 |
| Viscosifier | 2.00 | Viscosifier | 2.00 | Viscosifier | 5.00 |
| Biozan (lbs)[1] | | Biozan (lbs) | | BHC (lbs)[5] | |
| Fluid Loss Additives | | Fluid Loss Additives | | Fluid Loss Additives | |
| Polydrill (lbs)[2] | 3.00 | Polydrill (lbs) | 3.00 | Polydrill (lbs) | 3.00 |
| Starch (lbs) | 6.00 | Starch (lbs) | 6.00 | Starch (lbs) | 3.00 |
| Resinex (lbs)[3] | | | | | |
| Dispersant | 4.00 | Dispersant | 4.00 | Dispersant | 4.00 |
| Lignox (lbs)[4] | | Lignox (lbs) | | Lignox (lbs) | |
| Barite (lbs) | 324.00 | Barite (lbs) | 316.40 | Barite (lbs) | 157.40 |
| KOH (lbs) | 2.00 | | | KOH (lbs) | 2.00 |

[1]Biopolymer - trademark of Kelco Rotary.
[2]Synthetic polymer - trademark of SKW Chemicals.
[3]Sulfonated lignite plus resin - trademark of Dresser Industries.
[4]Calcium lignosulfonate - trademark of NL Baroid.
[5]Mixed metal layered hydroxide - trademark of Westbridge.

| 4 SEA WATER | | 5 SEA WATER/NaCl (90%/10%) | | 6 SEA WATER/NaCl (90%/10%) | |
|---|---|---|---|---|---|
| Density (ppg) | 15.00 | Density (ppg) | 15.00 | Density (ppg) | 12.50 |
| Base Fluid (bbl) | 0.58 | Base Fluid (bbl) | 0.67 | Base Fluid (bbl) | 0.77 |
| POLS/PECP 50/50% w/w) (bbl) | 0.15 | POLS (bbl) Lime/Gypsum | 0.07 0.07 | 1,2,3,5 Cyclohexanetetrol (bbl) | 0.09 |
| Lime (lbs) | 4.00 | (50/50% w/w) (lbs) | 4.00 | Lime (lbs) | 4.00 |
| | | | | Prehydrated Bentonite (lbs) | 10.00 |
| Drill Solids (lbs) | 45.00 | Drill Solids (lbs) | 45.00 | Drill Solids (lbs) | 25.00 |
| Viscosifer | 2.50 | Viscosifer | 2.50 | Viscosifier | 5.00 |
| Biozan (lbs) | | Biozan (lbs) | | BHC (lbs) | |
| Fluid Loss Additives | | Fluid Loss Additives | | Fluid Loss Additives | |
| Polydrill (lbs) | 3.00 | Polydrill (lbs) | 3.00 | Polydrill (lbs) | 6.00 |
| Starch (lbs) | 3.00 | Starch (lbs) | 3.00 | ASP 900[7] (lbs) | 6.00 |
| Dispersant | 4.00 | Dispersent | 2.00 | Dispersant | 6.00 |
| Morex[8] (lbs) | | Miltemp[6] (lbs) | | Morex (lbs) | |
| Barite (lbs) | 309.90 | Barite (lbs) | 292.50 | Barite (lbs) | 157.40 |

-continued

| | |
|---|---|
| KOH (lbs) | 2.00 |

[6] Sulfonated styrene maleic anhydride - trademark of Milpark.
[7] Humate acrylic polymer - trademark of Nalco, Inc.
[8] Polysaccharide - trademark of Grain Processing Co.

| 7 SEA WATER/NaCl (80%/20%) | | 8 SEA WATER/NaCl (80%/20%) | | 9 SEA WATER | |
|---|---|---|---|---|---|
| Density (ppg) | 12.50 | Density (ppg) | 15.00 | Density (ppg) | 15.000 |
| Base Fluid (bbl) | 0.77 | Base Fluid (bbl) | 0.61 | Base Fluid (bbl) | 0.730 |
| | | Sorbitol (bbl) | 0.15 | | |
| 1,2 propanediol (bbl) | 0.09 | | | PECP (bbl) | 0.015 |
| Lime (lbs) | 4.00 | Lime (lbs) | 15.00 | Lime (lbs) | 4.000 |
| Prehydrated Bentonite (lbs) | 10.00 | | | | |
| Drill Solids (lbs) | 25.00 | Drill Solids (lbs) | 45.00 | Drill Solids (lbs) | 45.000 |
| Viscosifier | 5.00 | Viscosifier | 2.50 | Viscosifier | 2.000 |
| BHC (lbs) | | Biozan (lbs) | | Biozan (lbs) | |
| Fluid Loss Additives | | Fluid Loss Additives | | Fluid Loss Additives | |
| Polydrill (lbs) | 6.00 | Polydrill (lbs) | 3.00 | Polydrill (lbs) | 3.000 |
| ASP 900 (lbs) | 6.00 | Starch (lbs) | 3.00 | Starch (lbs) | 6.000 |
| Dispersant | 4.00 | Dispersant | 4.00 | Dispersant | 4.000 |
| Lignox (lbs) | | Morex (lbs) | | Lignox (lbs) | |
| Barite (lbs) | 157.40 | Bariate (lbs) | 271.20 | Barite (lbs) | 295.600 |
| | | | | KOH (lbs) | 2.000 |

| 10 SEA WATER/KCl (80%/20%) | | 11 SEA WATER/NaCl (80%/20%) | | 12 SEA WATER | |
|---|---|---|---|---|---|
| Density (ppg) | 15.00 | Density (ppg) | 15.00 | Density (ppg) | 15.00 |
| Base Fluid (bbl) | 0.69 | Base Fluid (bbl) | 0.73 | Base Fluid (bbl) | 0.58 |
| POLS (bbl) | 0.08 | PECP/BDO[9] (50/50% w/w) (bbl) | 0.04 | Ethylene Glycol (bbl) | 0.15 |
| Lime (lbs) | 4.00 | Lime (lbs) | 10.00 | Gypsum (lbs) | 10.00 |
| Drill Solids (lbs) | 45.00 | Drill Solids (lbs) | 45.00 | Drill Solids (lbs) | 45.00 |
| Viscosifier | 4.00 | Viscosifier | 2.50 | Viscosifier | 2.50 |
| HP 007 (lbs)[8] | | Biozan (lbs) | | Biozan (lbs) | |
| Fluid Loss Additives | | Fluid Loss Additives | | Fluid Loss Additives | |
| Polydrill (lbs) | 6.00 | Polydrill (lbs) | 3.0 | Polydrill (lbs) | 3.00 |
| Resinex (lbs) | 6.00 | Starch (lbs) | 3.0 | Starch (lbs) | 3.00 |
| Dispersant | 4.00 | Dispersant | 4.00 | Dispersant | 4.00 |
| Morex (lbs) | | Morex (lbs) | | Lignox (lbs) | |
| Barite (lbs) | 273.10 | Barite (lbs) | 274.10 | Barite (lbs) | 309.90 |
| | | | | KOH (lbs) | 2.00 |

[8] Polysaccharide from beet pulp - trademark of Aqualon Co.
[9] BDO is a mixture of monocyclicdietherdiols (e.g., cis or trans 2,5-bix (hydroxymethyl) P-dioxane, cis or trans 2,6-bis (hydroxymethyl) P-dioxane, glycerine acetal of hydracrylaldehyde).

| 13 SEA WATER/NaCl (90%/10%) | | 14 SEA WATER/NaCl (90%/10%) | | 15 SEA WATER/NaCl (80%/20%) | |
|---|---|---|---|---|---|
| Density (ppg) | 15.00 | Density (ppg) | 12.50 | Density (ppg) | 15.00 |
| Base Fluid (bbl) | 0.67 | Base Fluid (bbl) | 0.77 | Base Fluid (bbl) | 0.77 |
| Glycerol | 0.07 | BDO (bbl) | 0.09 | 2-methyl 1,2 butanediol (bbl) | 0.09 |
| Gypsum (lbs) | 4.00 | Gypsum (lbs) | 4.00 | Lime (lbs) | 4.00 |
| | | Prehydrated Bentonite (lbs) | 10.0 | | |
| Drill Solids (lbs) | 45.00 | Drill Solids (lbs) | 25.0 | Drill Solids (lbs) | 45.00 |
| Viscosifier | 2.5 | Viscosifier | 5.00 | Viscosifier | 2.50 |
| Biozan (lbs) | | BHC (lbs) | | Biozan (lbs) | |
| Fluid Loss Additives | | Fluid Loss Additives | | Fluid Loss Additives | |
| Polydrill (lbs) | 3.00 | Polydrill (lbs) | 6.00 | Polydrill (lbs) | 3.00 |
| Starch (lbs) | 3.00 | ASP 900 (lbs) | 6.00 | Starch (lbs) | 3.00 |
| Dispersant | 2.00 | Dispersant | 2.00 | Dispersant | 2.00 |
| Lignox (lbs) | | Morex (lbs) | | Lignox (lbs) | |
| Barite (lbs) | 292.50 | Barite (lbs) | 157.40 | Barite (lbs) | 271.20 |
| KOH (lbs) | 2.00 | | | | |

| 16 SEA WATER/NaCl (90%/10%) | | 17 SEA WATER/NaCl (80%/20%) | | 18 SEA WATER/NaCl (80%/20%) | |
|---|---|---|---|---|---|
| Density (ppg) | 12.50 | Density (ppg) | 12.50 | Density (ppg) | 15.00 |
| Base Fluid (bbl) | 0.77 | Base Fluid (bbl) | 0.77 | Base Fluid (bbl) | 0.77 |
| | | | | Sorbitol/PECP (50% w/w) | 0.09 |
| PECP (bbl) | 0.09 | Monocyclicdietherdiols of propylenetriol (bbl) | 0.09 | Bentonite (lbs) | 20.00 |
| Gypsum (lbs) | 4.00 | Gypsum (lbs) | 4.00 | Lime (lbs) | 4.00 |
| Prehydrated Bentonite (lbs) | 10.00 | Prehydrated Bentonite (lbs) | 10.00 | | |
| Drill Solids (lbs) | 25.00 | Drill Solids (lbs) | 25.00 | Drill Solids (lbs) | 25.00 |
| Viscosifier | 5.00 | Viscosifier | 5.00 | Viscosifier | 2.50 |
| BHC (lbs) | | BHC (lbs) | | Biozan (lbs) | |
| Fluid Loss Additives | | Fluid Loss Additives | | Fluid Loss Additives | |
| Polydrill (lbs) | 3.00 | Polydrill (lbs) | 6.00 | Polydrill (lbs) | 3.00 |
| Starch (lbs) | 3.00 | ASP 900 (lbs) | 6.00 | Starch (lbs) | 3.00 |
| Dispersant | 2.00 | Dispersant | 2.00 | Dispersant | 2.00 |
| Morex (lbs) | | Morex (lbs) | | Morex (lbs) | |
| Barite (lbs) | 157.40 | Barite (lbs) | 157.40 | Barite (lbs) | 217.20 |
| KOH (lbs) | 2.00 | KOH (lbs) | 2.00 | | |

-continued

| SEA WATER/NaCl (90%/10%) | | SEA WATER/NaCl (80%/20%) | |
|---|---|---|---|
| Density (ppg) | 15.000 | Density (ppg) | 15.00 |
| Base Fluid (bbl) | 0.734 | Base Fluid (bbl) | 0.53 |
| PECP (bbl) | 0.015 | Dicyclicpentaetherdiols of pentanetriol (bbl) | 0.23 |
| Gypsum (lbs) | 4.000 | Lime (lbs) | 4.00 |
| Prehydrated Bentonite (lbs) | 10.000 | | |
| Drill Solids (lbs) | 25.000 | Drill Solids (lbs) | 45.00 |
| Viscosifier | 5.000 | Viscosifier | 2.50 |
| BHC (lbs) | | Biozan (lbs) | |
| Fluid Loss Additives | | Fluid Loss Additives | |
| Polydrill (lbs) | 3.000 | Polydrill (lbs) | 6.00 |
| Starch (lbs) | 3.000 | Starch (lbs) | 6.00 |
| | | Dispersant Lignox (lbs) | 4.00 |
| Barite (lbs) | 295.600 | Barite (lbs) | 272.30 |
| KOH (lbs) | 2.000 | | |

The foregoing description of the invention is merely intended to be explanatory thereof, and various changes in the details of the described method and compositions may be made within the scope of the appended claims without departing from the spirit of the invention.

What is claimed is:

1. A method for enhancing the effectiveness of a calcium base drilling fluid to reduce cuttings dispersion and increase wellbore stability during the drilling of an oil or gas well, comprising:

providing the components of a drilling fluid comprising solids, a fluid comprising water and a calcium compound in a concentration of from about 1 to 15 pounds per barrel of the fluid, said calcium compound being selected from the group consisting of lime, gypsum and mixtures thereof;

enhancing the effectiveness of the drilling fluid by admixing the drilling fluid components with (a) salt in a concentration of about 5 to 40% by weight of the fluid, said salt being selected from the group consisting of NaCl, NaBr, KCl, $CaCl_2$, $NaNO_3$, $NaC_2H_3O_2$, $KCHO_2$ and mixtures thereof, and (b) an alcohol in a concentration of from about 2 to 30% by weight of the fluid, said alcohol being a polycyclicpolyetherpolyol having a molecular weight $M_w$ in excess of 50,000; and reducing cuttings dispersion and increasing wellbore stability by drilling the wellbore with the enhanced calcium base drilling fluid and circulating the drilling fluid in the wellbore.

2. The method of claim 1, wherein the salt is in a concentration of about 8 to 25% by weight of the fluid.

3. The method of claim 1 wherein the salt is in a concentration of about 10 to 20% by weight of the fluid.

4. The method of claim 1 wherein the lime is selected from the group consisting of calcium oxide, calcium hydroxide and mixtures thereof.

5. The method of claim 1, wherein the gypsum is selected from the group consisting of calcium sulfate, calcium hydrate and mixtures thereof.

* * * * *